US006222606B1

(12) United States Patent
Fuchiwaki et al.

(10) Patent No.: US 6,222,606 B1
(45) Date of Patent: Apr. 24, 2001

(54) DUPLEX IMAGING APPARATUS

(75) Inventors: Takashi Fuchiwaki; Akihisa Maruyama; Yasutomo Ishii; Katsuya Takenouchi; Keitaro Sonoguchi; Yasutaka Naito; Yasuyuki Kobayashi; Yoko Shimomura; Kazuhiko Miyazato; Shigehiko Haseba; Minoru Ueki; Satoshi Matsuzaka, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/359,798

(22) Filed: Jul. 26, 1999

(30) Foreign Application Priority Data

Aug. 5, 1998 (JP) ........................................ 10-221617
Dec. 11, 1998 (JP) ........................................ 10-353535

(51) Int. Cl.[7] .......................... G03B 27/32; G03G 15/16
(52) U.S. Cl. .......................... 355/24; 399/308; 399/309
(58) Field of Search .................... 355/23, 24; 399/162, 399/297, 308, 309, 364

(56) References Cited

U.S. PATENT DOCUMENTS 5,835,831 * 11/1998 Staudenmayer et al. ............ 399/308
6,038,410 * 3/2000 Iriyama ................................ 399/51
6,052,551 * 4/2000 De Cook et al. .................... 399/296
6,078,762 * 6/2000 Fuchiwaki et al. .................. 399/94
6,078,773 * 6/2000 Shimojo et al. ..................... 399/302

FOREIGN PATENT DOCUMENTS 5-323704 12/1993 (JP) .
7-306618 11/1995 (JP) .

* cited by examiner

*Primary Examiner*—Russell Adams
*Assistant Examiner*—Rodney Fuller
(74) *Attorney, Agent, or Firm*—Oliff & Berridge, PLC

(57) ABSTRACT

Premising a duplex imaging apparatus having an image carrier provided with a plurality of image carrying regions, the image deterioration phenomenon (i.e., the so-called "oil ghost phenomenon"), as might otherwise accompany the local transfer of a releasing agent from a fixing unit to the image carrier, is effectively avoided. In a mode where the image carrier 2 is provided with the plural image carrying regions, duplex mode control unit 8 includes an imaging sequence determining portion 9 for determining such a fundamental imaging sequence that when duplex images are to be formed on sheets 4 more than an image carriable number of the image carrier 2, the fundamental sequence determining portion 9 causes the image carrier 2: to carry first screen images A less than the image carriable number in a first imaging cycle of an imaging unit 1; to carry images corresponding to the image carriable number in and after a second imaging cycle so that at least second screen images B may be positioned at the front of the first screen images A; and to carry the second screen images B less than the image carriable number in the last imaging cycle.

7 Claims, 31 Drawing Sheets

FULL COLOR MODE (1/3)

FULL COLOR MODE (2/3)

FULL COLOR MODE (3/3)

FIG.9

B&W MODE (1/2)

| | | BELT REFERENCE SIGNAL | G1 | G2 |
|---|---|---|---|---|
| 1ST IMAGING CYCLE | 1ST BELT TURN | ▽ | S-1(K) | SKIP |
| DUMMY CYCLE | 2ND BELT TURN | | SKIP | SKIP |
| 2ND IMAGING CYCLE | 3RD BELT TURN | | S-2K) | D-1(K) |
| DUMMY CYCLE | 4TH BELT TURN | | SKIP | SKIP |
| 3RD IMAGING CYCLE | 5TH BELT TURN | | S-3(K) | D-2(K) |
| 4TH IMAGING CYCLE | 6TH BELT TURN | | S-4(K) | SKIP |
| 5TH IMAGING CYCLE | 7TH BELT TURN | | SKIP | D-3(K) |
| 6TH IMAGING CYCLE | 8TH BELT TURN | | S-5(K) | D-4(K) |
| DUMMY CYCLE | 9TH BELT TURN | | SKIP | SKIP |

FIG.10

B&W MODE (2/2)

| | | G1 | G2 |
|---|---|---|---|
| 7TH IMAGING CYCLE | 10TH BELT TURN | S-6(K) | D-5(K) |
| 8TH IMAGING CYCLE | 11TH BELT TURN | S-7(K) | SKIP |
| 9TH IMAGING CYCLE | 12TH BELT TURN | SKIP | D-6(K) |
| 10TH IMAGING CYCLE | 13TH BELT TURN | S-8(K) | D-7(K) |
| DUMMY CYCLE | 14TH BELT TURN | SKIP | SKIP |
| 11TH IMAGING CYCLE | 15TH BELT TURN | S-9(K) | D-8(K) |
| 12TH IMAGING CYCLE | 16TH BELT TURN | S-10(K) | SKIP |
| 13TH IMAGING CYCLE | 17TH BELT TURN | SKIP | D-9(K) |
| FINAL IMAGING CYCLE | 18TH BELT TURN | SKIP | D-10(K) |

FULL COLOR MODE (1/2)

FIG.18

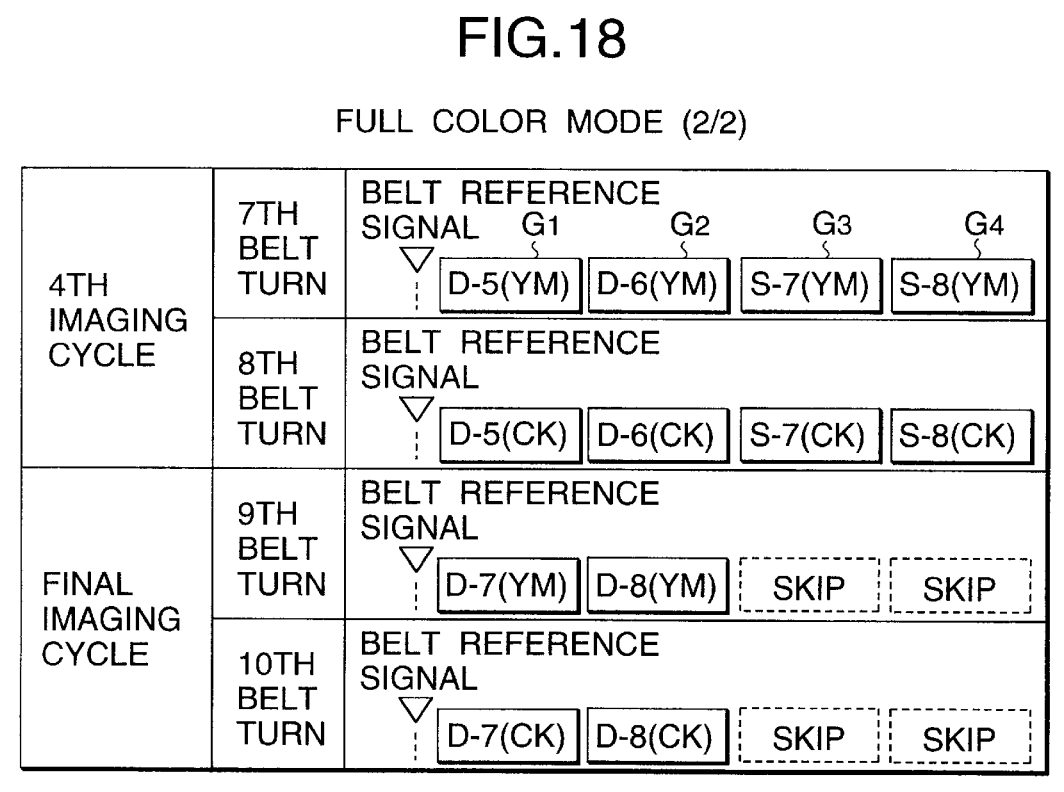

FULL COLOR MODE (2/2)

| | | | | | | |
|---|---|---|---|---|---|---|
| 4TH IMAGING CYCLE | 7TH BELT TURN | BELT REFERENCE SIGNAL | D-5(YM) [G1] | D-6(YM) [G2] | S-7(YM) [G3] | S-8(YM) [G4] |
| | 8TH BELT TURN | BELT REFERENCE SIGNAL | D-5(CK) | D-6(CK) | S-7(CK) | S-8(CK) |
| FINAL IMAGING CYCLE | 9TH BELT TURN | BELT REFERENCE SIGNAL | D-7(YM) | D-8(YM) | SKIP | SKIP |
| | 10TH BELT TURN | BELT REFERENCE SIGNAL | D-7(CK) | D-8(CK) | SKIP | SKIP |

FULL COLOR MODE(2/2)

AUTO DUPLEX - IDENTICAL IMAGE CONTINUOUS RUN

AUTO DUPLEX - IDENTICAL IMAGE CONTINUOUS RUN

SIMPLEX FULL FACE HALF TONE

DUPLEX IMAGING APPARATUS

BACKGROUND OF THE INVENTION

1. Field of the Invention

The present invention relates to a duplex imaging apparatus for forming images on the two faces of a sheet and, more particularly, to improvements in the duplex imaging apparatus of the mode in which a carrier has a plurality of image carrying regions to transfer an unfixed image on the image carrier to a sheet and to fix the unfixed images, as formed consecutively on the two faces of the sheet, individually by a fixing unit.

Here, the image carrier is defined to include not only an image forming carrier such as a photosensitive member but also an intermediate transferor. Therefore, the image carrier naturally includes the mode in which only the intermediate transferor has a plurality of image carrying regions, in the duplex imaging apparatus having the intermediate transferor, for example.

2. Description of the Related Art

The imaging apparatus of the prior art will be exemplified by an intermediate transfer type imaging apparatus. This imaging apparatus is provided with developers of individual color components of black (Bk), yellow (Y), magenta (M) and cyan (C), for example, around a latent image carrier such as a photosensitive drum, and a belt-shaped intermediate transferor, for example, is arranged to face the latent image carrier. The unfixed toner images of the individual color components, as formed on the latent image carrier at each turn of the latent image carrier, are primarily transferred in a consecutive manner to the intermediate transferor, and the synthesized primary transfer images, as superposed on the intermediate transferor, are then secondarily transferred to a sheet such as a form or an OHP sheet thereby to form a desired image on the sheet (as disclosed in Unexamined Published Japanese Patent Application No. 5-323704, for example).

This type is advantageous in that the disturbance of the image and the color shift at the time of a multiplex transfer can be effectively prevented without considering the thickness or surface characteristics of the sheet or the conveyance characteristics of the sheet to the latent image carrier, because the synthesized toners image having been multiplexly transferred to the intermediate transferor are transferred altogether to the sheet.

Of the imaging apparatus of this kind, moreover, the duplex imaging apparatus for forming images on the two faces of the sheet performs a series of processes to fix the unfixed toner image, as transferred to one side (or surface) of the sheet, by a fixing unit at the time of selecting the duplex mode, for example, to convey the fixed toner image again to the secondary transfer portion after the sheet is inverted through a sheet returning inversion mechanism, to transfer the synthesized primary transfer image or a sheet back image, as formed on the intermediate transferor, secondarily to the other side (or back) of the sheet, and to fix the secondarily transferred image in the fixing unit.

On the other hand, the fixing unit is equipped with a pair of fixing rolls (i.e., a heat fixing roll and a pressure fixing roll to be brought into pressure contact with the heat fixing roll) to turn in contact with each other, for example. The unfixed toner on the sheet is fixed by passing the sheet through the nip region of the fixing rolls. From the standpoint of preventing the so-called "offset phenomenon" in which the toner image on the sheet transits toward the fixing rolls, there is usually adopted a method of feeding the individual fixing rolls with a releasing agent or oil (e.g., silicone oil).

At this time, it is arbitrary to add a releasing agent feeder to each of the paired fixing rolls. From the standpoint of simplifying the apparatus construction, however, there is frequently adopted a method of arranging a releasing agent feeder only on the side of the heat fixing roll to feed the heat fixing roll directly with the releasing agent and the pressure fixing roll indirectly through the surface of the heat fixing roll with the releasing agent.

On the other hand, the amount of the releasing agent to be fed could be controlled according to the amount of the releasing agent applied to the fixing roll. From the standpoint of simplifying the apparatus construction, however, there is adopted a method of feeding a constant amount easily.

As a method of enhancing the productivity in the aforementioned duplex imaging apparatus, moreover, there has already been proposed a method by which the individual images can be individually transferred to the sheet by releasing a plurality of image carrying regions on an intermediate transferor to retain a plurality of images on the intermediate transferor in a series of imaging cycles till the transfer to the sheet (as disclosed in Unexamined Published Japanese Patent Application No. 7-306618, for example).

Here, the intermediate transfer type duplex imaging apparatus of this kind has been found to have a technical problem that the halftone image of a wide range in the simplex mode is liable, if taken after consecutive fifty runs of an identical image in the automatic duplex mode, to have a lower density than the remaining regions thereby to appear as a residual image (as will be called the "oil ghost phenomenon", if necessary).

We have investigated the causes for the aforementioned oil ghost phenomenon and have reached the following conclusions.

In the duplex imaging apparatus including a fixing unit in which a constant feed type releasing agent feeder is attached only to the side of the heat fixing roll, for example, it is assumed that the consecutive runs of an identical image are made in the automatic duplex mode.

At this time, as shown in FIG. 31A, a sheet 300 having an unfixed image formed on its one side (or surface) is guided through a fixing unit 301. Since a releasing agent 303 is also fed to the side of a pressure fixing roll 302 of the fixing unit 301, it occurs that the releasing agent 303 sticks to the substantially whole area of the other side (or back) of the sheet 300.

At the transfer time of the sheet 300 to the back, moreover, when the sheet 300 having one fixed side passes again through the secondary transfer portion, the releasing agent 303 having stuck to the back of the sheet 300 will transit to an intermediate transferor 304, as shown in FIG. 31B, in a manner to correspond to a non-image portion 305 [the region of the sheet 300 excepting an unfixed image (or image portion) 306 for the back on the intermediate transferor].

When the identical image is to be subjected to considerably consecutive runs, the releasing agent 303 is hardly fed to the portion of the image portion 306 at the identical portion of the intermediate transferor 304 but will sequentially transit only to the portion corresponding to the non-image portion 305, so that the transfer efficiency of the non-image portion 305 rises far extremely than the image portion 306.

If the wide range halftone image is taken in this state in the simplex mode, as shown in FIG. 31C, the portion corresponding to the image portion 306 in the automatic duplex mode has a lower transfer efficiency than the other portion [i.e., the portion corresponding to the non-image portion 305 in the automatic duplex mode], there seems to appear the residual image (or the negative ghost) in which a halftone image 307 having a thin portion corresponding to the image portion 306 turns into a halftone image 308 having a thick portion corresponding to the non-image portion 305.

Especially in the duplex imaging apparatus including an intermediate transferor having a plurality of image carrying regions, there arises a situation in which the images in the individual image carrying regions on the intermediate transferor are consecutively transferred to the plural sheets so that the individual sheets pass consecutively through the fixing unit.

At this time, the fixing unit is indispensably required to perform the fixing process without any offset even under the condition in which the plural sheets consecutively pass. It is, therefore, necessary to set the amount of releasing agent to be fed more than that of the mode of one image carrying region. As a result, the aforementioned oil ghost phenomenon is liable to appear more prominently.

In the duplex imaging apparatus thus far described, on the other hand, the conveyance span of the sheets to pass through the fixing unit becomes longer when the full color mode for forming the full color image is selected than when the ordinary monotone mode is selected. As a result, the amount of releasing agent to transit from the heat fixing roll surf ace of the fixing unit to the pressure fixing roll becomes more so that the aforementioned oil ghost phenomenon becomes liable to appear more prominently.

Here, the technical problems thus far described should not be limited to the intermediate transfer type duplex imaging apparatus but can likewise occur in the direct transfer type duplex imaging apparatus in which the images are transferred directly to the sheets from a latent image carrier such as a photosensitive belt.

SUMMARY OF THE INVENTION

The invention has been conceived to solve the technical problems thus far described and contemplates to provide a duplex imaging apparatus which is enabled, by premising a duplex imaging apparatus having an image carrier provi ded with a plurality of image carrying regions, to effectively avoid the image deterioration phenomenon (i.e., the so-called "oil ghost phenomenon"), as might otherwise accompany the local transfer of a releasing agent from a fixing unit to the image carrier.

According to the invention, as shown in FIGS. 1 and 2, there is provided a duplex imaging apparatus comprising: an imaging unit 1 including an image carrier 2 having a plurality of image carrying regions G (e.g., G1 and G2) for carrying an unfixed image on the image carrying regions G (G1 and G2) of the image carrier 2 in a series of imaging cycles and for transferring said unfixed image to a sheet 4; a fixing unit 5 for fixing the unfixed image formed on the sheet 4 by the imaging unit 1; a sheet returning conveyor mechanism 7 for inverting the sheet 4 having one fixed side having passed through the fixing unit 5 and for returning the same again to the sheet transfer portion of the imaging unit; and duplex mode control means 8 for controlling the imaging unit 1, the fixing unit 5 and the sheet returning conveyor mechanism 7 individually at a duplex mode selected time to fix the unfixed images, as consecutively formed on the two faces of the sheet 4, individually by the fixing unit 5, wherein the fixing unit 5 includes a pair of fixing members 5*a* and 5*b* for nipping and conveying the sheet 4 such that only one fixing member 5*a*, as positioned on the side of the unfixed image holding face of the sheet 4 is provided with releasing agent feed means 6 whereas the other fixing member 5*b* to be used feeds a predetermined amount of releasing agent indirectly, and wherein the duplex mode control means 8 includes an imaging sequence determining portion 9 for determining such a fundamental imaging sequence that when duplex images are to be formed on the sheets 4 more than the image carriable number of the image carrier 2, the fundamental sequence determining portion 9 causes the image carrier 2: to carry first screen images A less than the image carriable number in a first imaging cycle of the imaging unit 1; to carry images corresponding to the image carriable number in and after a second imaging cycle so that at least second screen images B may be positioned at the front of the first screen images A; and to carry the second screen images B less than the image carriable number in the last imaging cycle.

In this technical means, the imaging unit 1 according to the invention may be selected from any if it can transfer the unfixed image, as carried on the image carrier 2, to the sheet 4.

Here, the image carrier 2 may be exemplified, as shown in FIG. 1, by a mode including an image forming carrier 2*a* made of a photosensitive member or a dielectric member for forming and carrying the unfixed image, and an intermediate carrier 2*b* arranged to face the image forming carrier 2*a* for transferring the image on the image forming carrier 2*a* primarily before the image is transferred to the sheet 4. However, the image carrier 2 should not be limited thereto but can cover the mode including the image forming carrier 2*a* exclusively.

At this time, in the mode where the image carrier 2 includes the intermediate transferor 2*b*, at least the intermediate transferor 2*b* has a plurality of image carrying regions G (e.g., G1 and G2). In the mode where the image carrier 2 includes only the image forming carrier 2*a*, on the other hand, the image forming carrier 2*a* has a plurality of image carrying regions G. on the other hand: the image forming carrier 2*a* may be one or more; the image forming carrier 2*a* and the intermediate transferor 2*b* may be of a drum or belt shape mode; and the method of forming the unfixed image may be suitably selected from the electrophotographic method or the electrostatic transfer method.

Moreover, the imaging unit 1 according to the invention should not be limited to one for forming a full color image but may form a multicolor image such as a dichromatic or trichromatic image, or a monochromatic, or may select the individual image forming modes arbitrarily.

On the other hand, the fixing unit 5 is sufficient to have the paired fixing members 5*a* and 5*b* for nipping and conveying the sheet 4 and may be exemplified by a representative mode of a construction of paired rolls, a combination of rolls and a belt, or a pair of belts.

Moreover, the fixing members 5*a* and 5*b* are presented by a mode in which one fixing member 5*a* is made of a heating member whereas the other fixing member 5*b* is a pressure member to come into pressure contact with the heating member. In this case, suitable design changes may be made to enhance the fixing performance such that an external heat source is added to the fixing member 5*a* acting as a heating member or such that a heat source is added to the fixing member 5*b* acting as a pressure member.

On the other hand, the releasing agent feed means 6 may be any if it is disposed only at the fixing member 5*a* positioned on the side of the unfixed image holding face of the sheet 4 and feeds a constant amount of releasing agent (e.g., silicone oil) for preventing the offset phenomenon.

In the mode of this case where the releasing agent takes a constant value, the fixing unit 5 may be held in the contact state even while it is unused. In another mode, for example, the releasing agent feed means 6 may be spaced from the fixing member 5*a* or released from its drive to prevent the excessive feed of the releasing agent.

Here, the setting of the amount of releasing agent may be suitably selected. From the standpoint of effectively preventing the seizure of the sheet 4 by the fixing member 5*b* or the offset phenomenon (or heterogeneous solution) of the fixed image positioned on the side of the fixing member 5*b*, however, it is preferable to set the amount of releasing agent on the side of the fixing member 5*b* facing the unfixed face of the sheet 4 to have the second screen image B fixed, to 0.5 microliter per Japanese Industrial Standards A4 or more, more preferable to 0.7 microliter per Japanese Industrial Standards A4 or more. Japanese Industrial Standard A4 paper measures 210 mm×297 mm (623.7 sq. cm). The terms "Japanese Industrial Standard A4" and "623.7 sq. cm" will be used interchangeably throughout the specification and claims.

From the standpoint of preventing the so-called "oil ghost phenomenon" in the ordinary use condition (where an average number of originals are consecutively run at random), on the other hand, it is preferable to set the amount of releasing agent on the side of the fixing member 5*b* facing the unfixed face of the sheet 4 to have the first screen image A fixed, to 3 microliter per Japanese Industrial Standards A4 or less. Especially from the standpoint of avoiding the aforementioned oil ghost phenomenon reliably in a stress condition (where the oil ghost phenomenon is liable to occur in the mode of running one hundred identical originals consecutively in the automatic duplex mode, under a high humidity circumstance or when a completely water impregnated sheet is used), it is preferable to set the amount of releasing agent on the side of the fixing member 5*b* facing the unfixed face of the sheet 4 to have the first screen image A fixed, to 1.5 microliter per Japanese Industrial Standards A4 or less.

Moreover, the sheet returning conveyor mechanism 7 may be suitably selected if the sheet 4 having one fixed side and having passed through the fixing unit 5 is inverted and returned again to the sheet transfer portion of the imaging unit 1. From the standpoint of a quick process in the duplex mode, however, it is preferable to employ the so-called "intermediate tray-less method", in which the sheet having one fixed side and having passed through the fixing unit 5 is inverted and instantly returned to the sheet transfer portion without providing any intermediate tray for accommodating the sheet 4 temporarily.

Especially even if the intermediate tray-less method is adopted so that the sheet 4 having one fixed side and having passed through the fixing unit 5 is returned again to the sheet transfer portion within a relatively short time period, the invention is effective in that the amount itself of the releasing agent having stuck to the second face (or back) of the sheet having one fixed side can be suppressed to suppress the amount of releasing agent to transit to an intermediate transferor 3.

On the other hand, the duplex mode control means 8 has to be equipped with the imaging sequence determining portion 9 (as shown in FIG. 2) for determining the aforementioned fundamental imaging sequence.

Here, this imaging sequence determining portion 9 may execute the fundamental imaging sequence for all the duplex modes but may execute the fundamental imaging sequence only in case the oil ghost phenomenon is prominently liable to appear.

Specifically, the imaging sequence determining portion 9 may determine the fundamental imaging sequence such that when the duplex images are formed on the sheets 4 more than the image carriable number of the image carrier 2 under the condition in which an imaging mode (e.g., a full color mode) for a long conveyance span of the sheets 4 is selected, the imaging sequence determining portion 9 causes the image carrier 2: to carry the first screen images A less than the image carriable number in the first imaging cycle of the imaging unit 1; to carry the images corresponding to the image carriable number in and after the second imaging cycle so that at least the second screen images B may be positioned at the front of the first screen images A; and to carry the second screen images B less than the image carriable number in the last imaging cycle, and the imaging sequence determining portion 9 may determine an imaging sequence other than the fundamental imaging sequence under other conditions (e.g., an imaging mode in which the conveyance span of the sheets 4 is short, as in a monochromatic mode such as the B&W [Black & White] mode).

In this case, the imaging mode such as the B&W mode suppresses the amount of the releasing agent to be transited from the fixing unit 5 to the back of the sheet 4 because of the short conveyance span of the sheet 4. As a result, it hardly occurs that much releasing agent will transit locally from the sheet 4 having one fixed side to the image carrier 2, thereby to reduce the fear of the appearance of the so-called "oil ghost phenomenon".

In the imaging mode such as the B&W mode, therefore, it is less necessary to adopt the aforementioned fundamental imaging sequence. Alternatively, it is possible to adopt the imaging sequence in which the productivity is preferred as the first priority, for example.

On the other hand, the imaging sequence determining portion 9 of the invention executes the first imaging cycle to the last imaging cycle consecutively. When the sheet returning conveyor passage of the sheet returning conveyor mechanism 7 is long or in accordance with the layout of the imaging unit 1 or the imaging process rate, however, it may become difficult to execute the first imaging cycle to the last imaging cycle consecutively.

Under this situation, as shown by phantom lines in FIG. 2, it is sufficient to insert a smaller number of dummy cycles than the image carriable number between the individual imaging cycles from the first imaging cycle to the last imaging cycle.

At this time, the imaging sequence determining portion 9 makes: one or more image carrying regions, as positioned on the back side in the advancing direction of the image carrier, into skip regions in which no first screen image is carried, in the first imaging cycle, and one or more image carrying regions, as positioned on this side in the advancing direction of the image carrier, into skip regions in which no second screen image is carried, in the last imaging cycle. Then, the skip regions of the first imaging cycle and the last imaging cycle function substantially as the dummy cycles so that the dummy cycles can be omitted from between the first imaging cycle and the second imaging cycle and between the last but one imaging cycle and the last imaging cycle.

According to this mode, therefore, less dummy cycles than the image carriable number may be inserted between the individual imaging cycles from the second imaging cycle to the last but one imaging cycle.

Here in the aforementioned mode, the dummy cycles both between the first imaging cycle and the second imaging cycle and between the last but one imaging cycle and the last imaging cycle are omitted. However, the imaging sequence determining portion 9 makes one or more image carrying regions, as positioned on the back side in the advancing direction of the image carrier, into skip regions in which no first screen image is carried, at least in the first imaging cycle, so that only the dummy cycles between the first imaging cycle and the second imaging cycle may be omitted. Alternatively, the imaging sequence determining portion 9 makes one or more image carrying regions, as positioned on this side in the advancing direction of the image carrier, into skip regions in which no second screen image is carried, at least in the last imaging cycle, so that only the dummy cycles may be omitted from between the last but one imaging cycle and the last imaging cycle.

As the prior art resembling the invention, on the other hand, a supplementary description will be made on Unexamined Published Japanese Patent Application No. 7-306618, for example.

This prior art has described the "technique for carrying a first screen image and a second screen image mixedly in a plurality of image carrying regions of an intermediate transferor (or transfer belt)", and has found a concept shared partially with the invention.

However, the aforementioned prior art has conceived to solve the technical problem such as an insufficient cleaning of the intermediate transferor or an instability of the image quality, as caused by the difference in the amount of releasing agent stuck to a plurality of image carrying regions (or panels). For this solution, the first screen image and the second screen image are alternately carried for each jot in the individual image carrying regions (or panels) of the intermediate transferor so that the releasing agent having stuck to the second screen image carrying face of the sheet may stick substantially homogeneously to the individual image carrying regions (or panels) of the intermediate transferor thereby to eliminate the difference in the amount of releasing agent having stuck to the panels.

In order to solve the technical problem of the oil ghost phenomenon to be caused by the excessive transit of the releasing agent to the image carrier 2 (e.g., the intermediate transferor 2*b*), on the contrary, according to the invention, the duplex mode control means 8 is provided with the imaging sequence determining portion 9 for determining the fundamental imaging sequence in which images corresponding to the image carriable number are carried in and after a second imaging cycle so that at least second screen images may be positioned at the front of the first screen images, thereby to suppress the amount of releasing agent itself to transit to the image carrier 2.

Therefore, the aforementioned prior art and the invention are absolutely difference in the technical problem and in the means for solving the problem.

Here will be described the actions of the aforementioned technical means.

In the fixing unit 5, as shown in FIGS. 1 and 2, the releasing agent feed means 6 feeds the releasing agent directly to one fixing member 5*a*, as positioned on the side of the unfixed image holding face of the sheet 4, and indirectly in a constant amount to the other fixing member 5*b*.

On the other hand, the imaging sequence determining portion 9 of the duplex mode control means 8 determines such a fundamental imaging sequence that when duplex images are to be formed on the sheets 4 more than the image carriable number of the image carrier 2 (e.g., the intermediate transferor 2*b*), the fundamental sequence determining portion 9 causes the image carrier 2: to carry first screen images A less than the image carriable number in a first imaging cycle of the imaging unit 1; to carry images corresponding to the image carriable number in and after a second imaging cycle so that at least second screen images B may be positioned at the front of the first screen images A; and to carry the second screen images B less than the image carriable number in the last imaging cycle.

At this time, for the time period from the second imaging cycle to the N-th imaging cycle before the last imaging cycle, the second screen image B is carried at the front of the first screen image A on the image carrying regions G (G1 and G2) of the image carrier 2, so that the sheet 4 having the transferred second screen image B passes through the fixing unit 5 prior to the sheet 4 having the transferred first screen image A.

In the fixing unit 5, therefore, much releasing agent is fed to the fixing member 5*b* at the time of fixing the second screen image B. At the time of fixing the first screen image A, however, the sheet 4 having two fixed faces and having previously passed absorbs the releasing agent from the surface of the fixing member 5*b* so that it is reduced on the side of the fixing member 5*b*.

In this state, the transition of the releasing agent to the image carrier 2 is minimized even if the sheet 4 having one transferred face arrives again at the sheet transfer portion.

On the other hand, the sheet 4 having two fixed sides is pressed and heated by the fixing member 5*b*, to which much releasing agent has been transited, so that the troubles such as the heterogeneous solution of the first screen image A and the offset of the once fixed image can be effectively avoided.

BRIEF DESCRIPTION OF THE DRAWINGS

FIG. 9 is an explanatory diagram showing a processing content (1/2) in a B&W (Black & White) mode to be used in Embodiment 1;

FIG. 10 is an explanatory diagram showing a processing content (2/2) in a B&W (Black & White) mode to be used in Embodiment 1;

FIG. 18 is an explanatory diagram showing a processing content (2/2) in a full color mode to be used in Embodiment 2;

DESCRIPTION OF THE PREFERRED EMBODIMENTS

The invention will be described in detail in connection with its embodiments with reference to the accompanying drawings.

[Embodiment 1]

Figure 1:
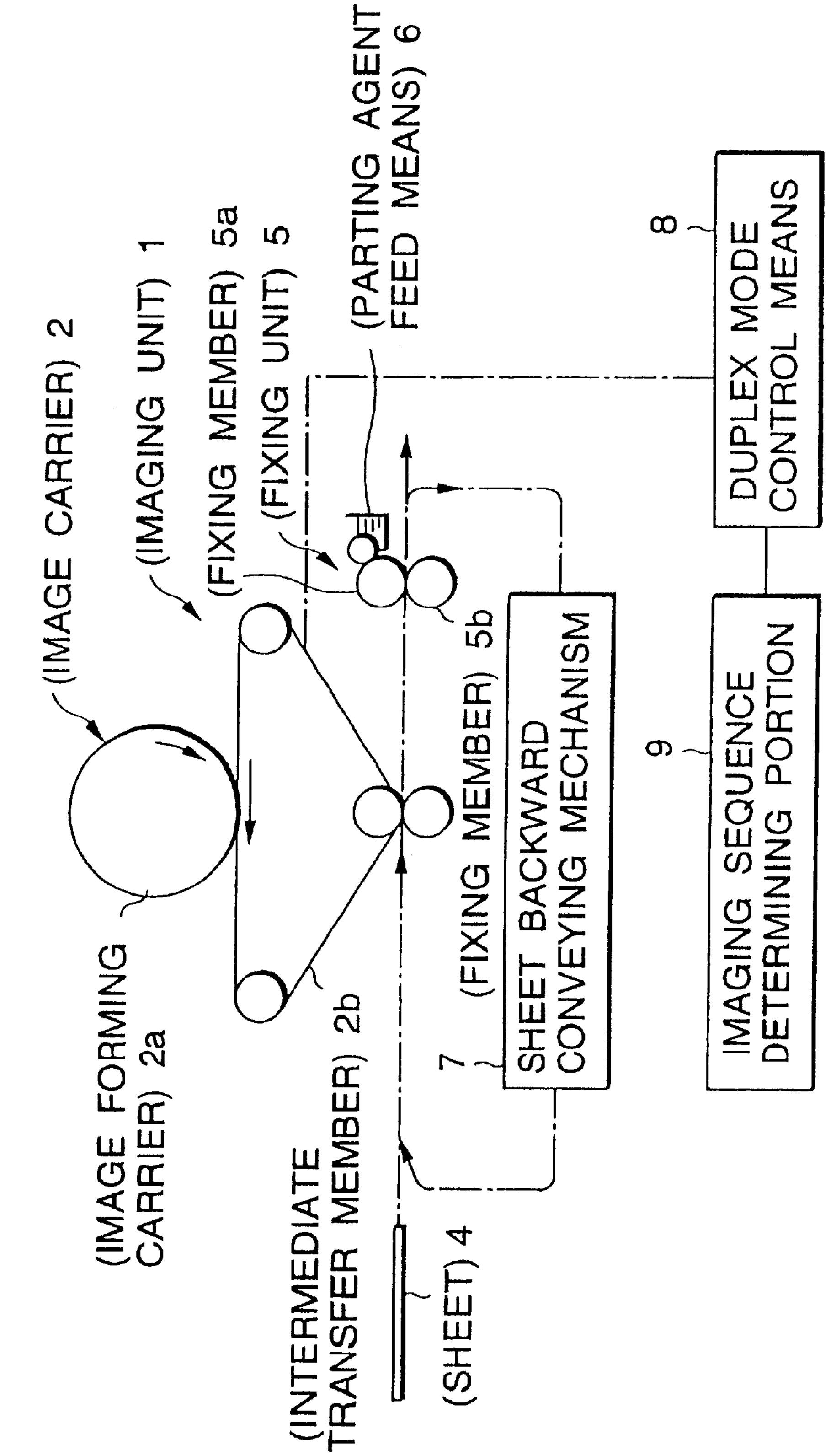
FIG. 1 is an explanatory diagram showing a summary of a duplex imaging apparatus according to the invention.
Figure 2:
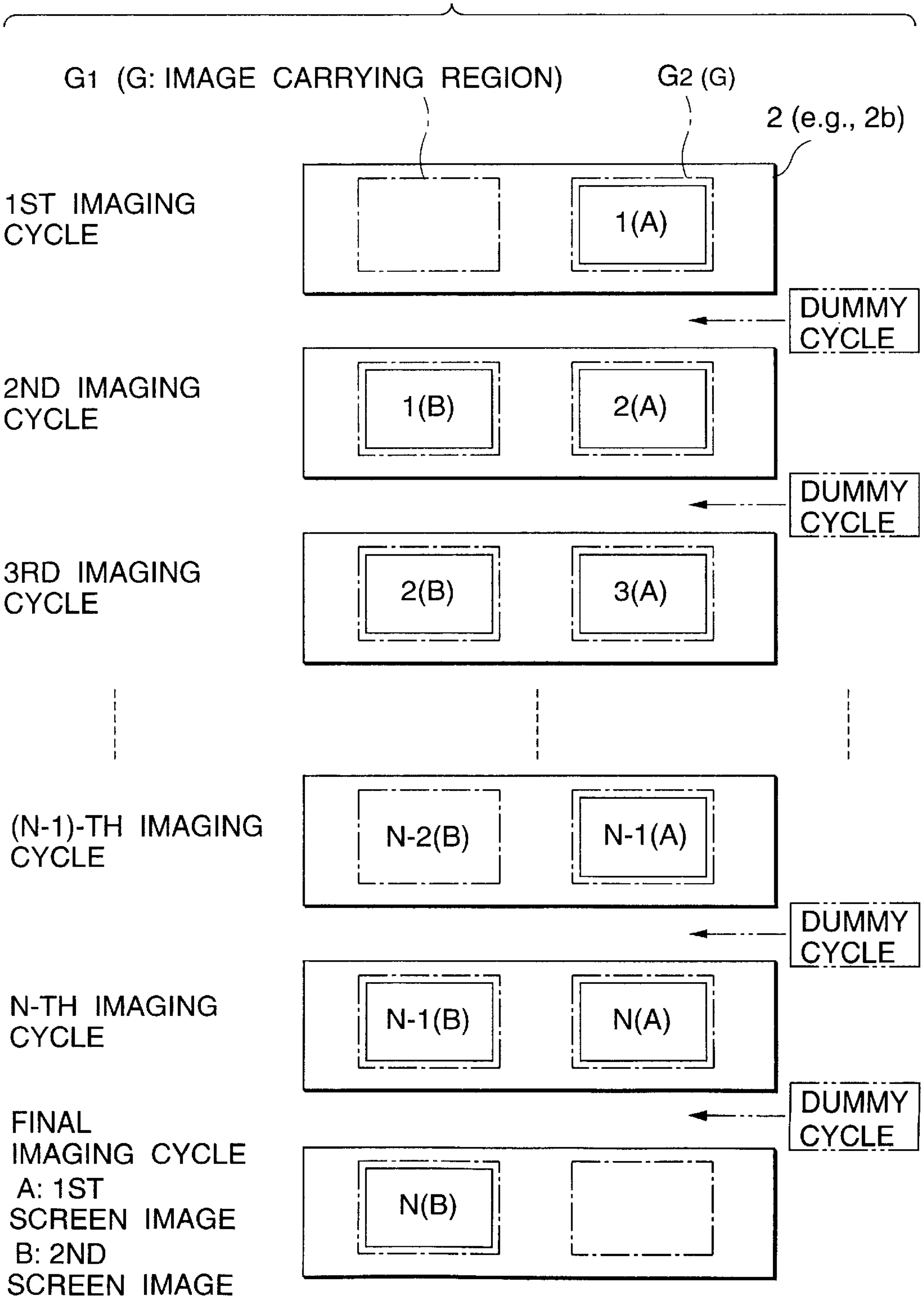
FIG. 2 is a schematic diagram showing a processing routine of an imaging sequence determining portion according to the invention.
Figure 3:
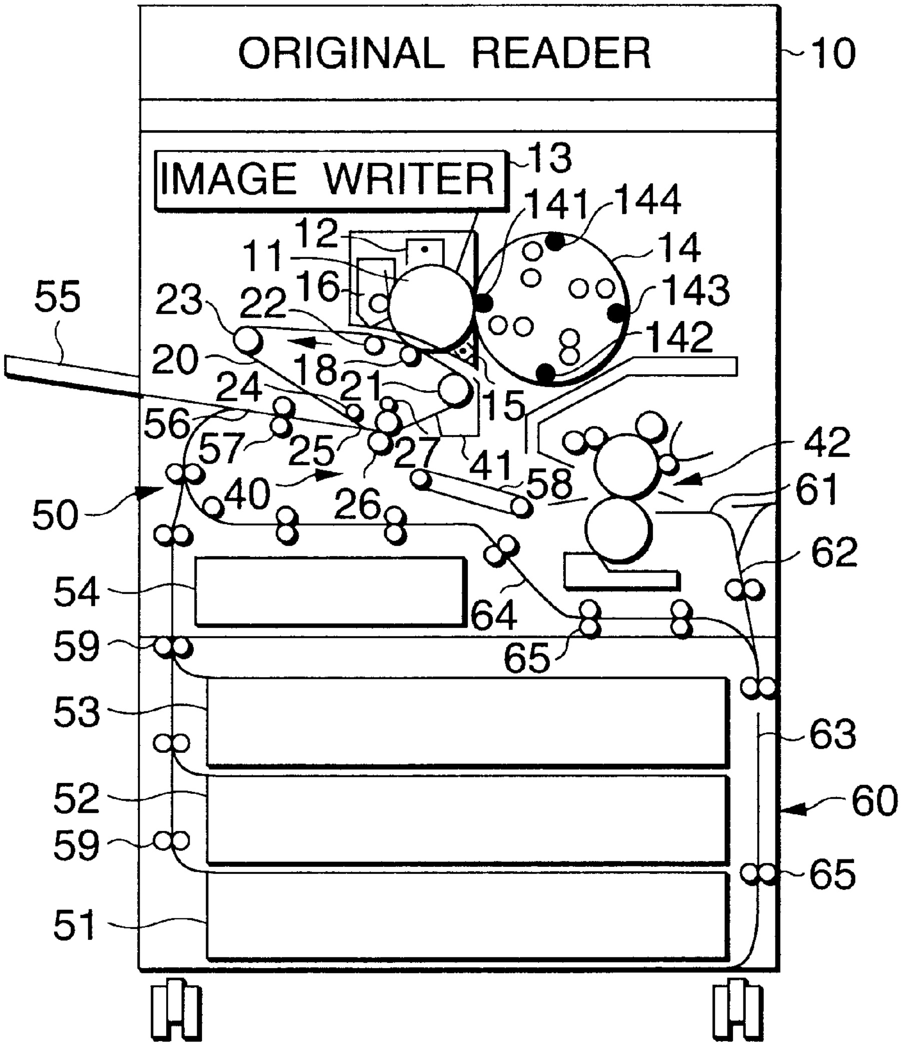
FIG. 3 is an explanatory diagram showing a summary of an imaging apparatus according to Embodiment 1.

FIG. 3 shows a schematic construction of an intermediate transfer type duplex imaging apparatus (or a color electrophotographic copying machine) to which the invention is applied.

In FIG. 3: reference numeral 10 designates an original reader for reading an original as an image of individual color components of yellow (Y), magenta (M), cyan (C) and block (K); numeral 11 a photosensitive drum (or a latent image carrier) for rotating in the direction of arrow, for example; numeral 12 a charger such as a corotron for precharging the photosensitive drum 11; numeral 13 an image writer such as a laser scanner for an original image or another image from the original reader 10, as an electrostatic latent image on the photosensitive drum 11; and numeral 14 a rotary developing device having developers 141 to 144 mounted to correspond to the individual yellow (Y), magenta (M), cyan (C) and black (K) colors, so that the electrostatic latent image formed on the photosensitive drum 11 is developed by any of the developers 141 to 144 to form toner images of the individual color components. Here, numeral 15 designates a pre-transferor such as a corotron for uniforming the polarities of the individual toner images on the photosensitive drum 11, and numeral 16 designates a drum cleaner for removing the residual toner from the photosensitive drum 11.

On the other hand, numeral 20 designates an intermediate transfer belt arranged to abut against the surface of the photosensitive drum 11. This intermediate transfer belt is so tensed on a plurality of (e.g., five in this embodiment) rolls 21 to 25 as to run in the direction of arrow.

Here, in this embodiment: the numeral 21 designates a drive roll for the intermediate transfer belt 20; the numerals 22 and 24 designate drive rolls; the numeral 23 designates a tension roll for controlling the tension of the intermediate transfer belt 20 to a constant value; and the numeral 25 designates an opposed roll (or backup roll) for a second transfer.

In this embodiment, moreover, the intermediate transfer belt 20 is made to have a surface resistivity of $10^6$ to $10^{14}$ $\Omega/\square$ and a thickness of 0.1 mm, for example, by containing a suitable quantity of carbon black or the like in either a resin such as polyimide, polycarbonate, polyester, polypropylene, polyethylene terephthalate, or a variety of rubbers.

At a position (or a primary transfer position) of the intermediate transfer belt 20, as opposed to the photosensitive drum 11, moreover, there is arranged on the back side of the intermediate transfer belt 20 a primary transfer device (or a transfer roll) 18. When a voltage of the polarity reversed from the charged polarity of the toner is applied to that transfer roll 18, the toner image T on the photosensitive drum 11 is electrostatically attracted by the intermediate transfer belt 20.

At a secondary transfer position of the intermediate transfer belt 20, as facing the conveyor passage of the (not-shown) forms as sheets, there is arranged a secondary transfer device 40. In this embodiment, the secondary transfer device 40 is composed of: a secondary transfer roll 26 arranged under pressure on the side of the toner image carrying face of the intermediate transfer belt 20; and the opposed roll (or the backup roll) arranged on the back side of the intermediate transfer belt 20 to act as the counter electrode of the secondary transfer roll 26.

In this embodiment, moreover, the secondary transfer roll 26 is grounded to the earth, and a bias of the same polarity as the charged one of the toner is stably applied to the backup roll 25 through a power supply roll 27.

Here, numeral 41 designates a belt cleaner for cleaning the intermediate transfer belt 20 of the residual toner.

In this embodiment, on the other hand, a form transfer line 50: transfers the forms from a predetermined number (e.g., four in this embodiment) of form trays 51 to 54 or a hand tray 55 via a predetermined form passage 56; positions and stops the forms once by a registration roll (or resist roll) 57 in the form passage 56; conveys the forms at a predetermined timing to the secondary transfer position; guiding the secondary-transferred forms to a conveyor belt 58; and conveys the forms to a fixing unit 42 by the conveyor belt 58. Here, the form passage 56 is equipped with a suitable number of paired conveyor rolls 59.

Especially in this embodiment, there is provided a form returning conveyor mechanism 60 for inverting the forms, as simplexly fixed by the fixing unit 42, when a duplex mode is selected, to return the inverted forms again to the secondary transfer position.

This form returning conveyor mechanism 60 is constructed, as shown in FIG. 3, for example, by providing a form branching passage 62 branched downward from a form discharge passage 61 extending from the fixing unit 42, by extending a form inverting passage 63 downward from the form branching passage 62, and by connecting a form returning passage 64 from the form inverting passage 63 to the form passage 56 just upstream of the secondary transfer position.

Moreover, the form branching passage 62, the form inverting passage 63 and the form returning passage 64 are equipped with a suitable number of paired conveyor rolls 65, of which the conveyor roll 65 provided for the form inverting passage 63 can rotate back and forth at a suitable timing.

Between the form discharging passage 61 and the form branching passage 62 and among the form branching passage 62, the form inverting passage 63 and the form returning passage 64, moreover, there are individually interposed the (not-shown) form switching gates for switching and selecting the form passages suitably according to the selected mode.

Figure 4:
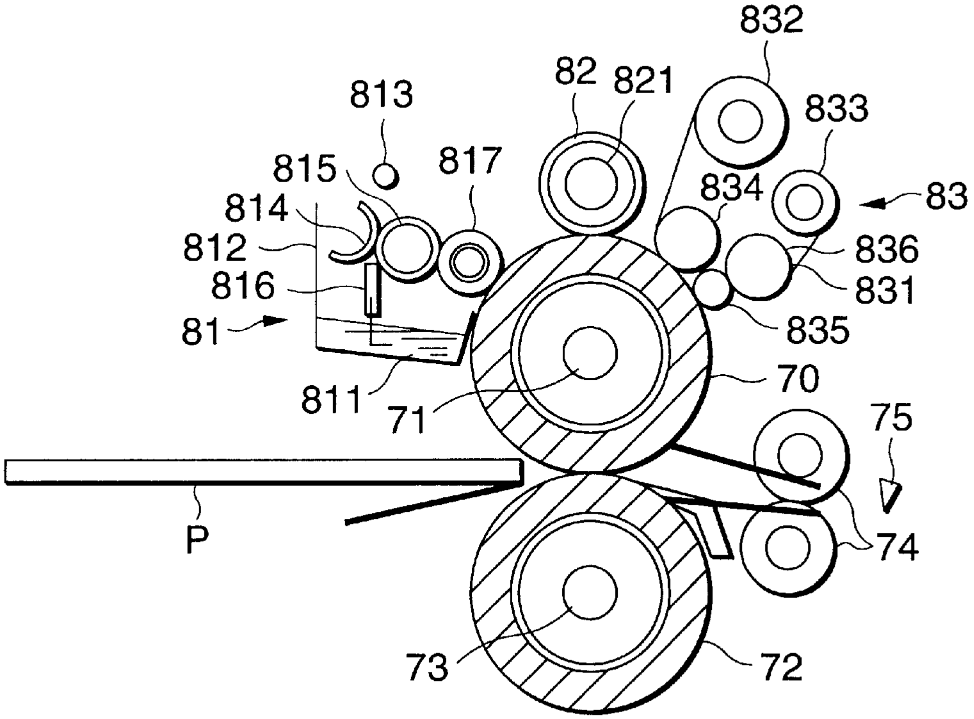
FIG. 4 is an explanatory diagram showing a detail of a fixing unit to be used in Embodiment 1.

In this embodiment, still moreover, the fixing unit 42 is constructed, as shown in FIG. 4, to include a heat fixing roll 70 having a built-in heater 71, and a pressure fixing roll 72 arranged to turn under pressure in a predetermined nip region with respect to the heat fixing roll 70 and having a builtin heater 73. At the exit side of the nip region of the two fixing rolls 70 and 72, there are arranged a pair of exit rolls 74, just downstream of which there is arranged an exit sensor 75 for detecting passage of a form paper P.

In this embodiment, the heat fixing roll 70 and the pressure fixing roll 72 are made of a hollow roll body having a predetermined external diameter (e.g., ϕ 65 mm) and have a hollow roll core (e.g., 4.5 mm) of aluminum. These rolls 70 and 72 are prepared by forming a substrate layer (having a thickness of 3 mm for the heat fixing roll 70 and a thickness of 2 mm for the pressure fixing roll 72, for example) of silicone rubber over the roll cores and by forming a surface layer of Biton or the like over the surface of the substrate layer.

Around the heat fixing roll 70 and upstream of the nip region of the two fixing rolls 70 and 72, moreover, there are sequentially arranged an oil feeder 81, an external heating roll 82 and a web cleaner 83.

In this embodiment, the oil feeder 81 is constructed by filling an oil pan 812 with oil (e.g., amine-denatured silicone oil, as will be specified in the following) as a toner releasing agent, by impregnating a wick 814 with the oil 811 in the oil pan 812 through an oil pipe 813, by arranging a pickup roll 815 in contact with the wick 814, by arranging a metaling blade 816 in contact with the pickup roll 815 for regulating the amount of oil on the surface of the pickup roll 815, and by interposing a donor roll 817 between the pickup roll 815 and the heat fixing roll 70, to feed the heat fixing roll 70 with a predetermined amount of oil through the donor roll 817.

The toner releasing agent to be used in this embodiment is exemplified by one containing an aromatic group containing organopolysilaxane, as expressed by the following general formula (I) and having a viscosity of 10 to 100,000 cs at 25° C.:

General Formula (I):

{wherein: A designates —$R^1$—X or —$R^1$—O—Yf—H [$R^1$ designates an alkylene group having a carbon number of 1 to 8, and X designates —$NH_2$ or —$NHR^2NH_2$ (wherein $R^2$ designates an alkylene group having a carbon number of 1 to 8), Y designates an alkylene group having a carbon number of 2 to 4, and f designates an integer of 0 to 10], b and c range $0 \leqq b \leqq 10$ and $10 \leqq c < 1{,}000$, respectively, and do not take 0 simultaneously, d designates 2 or 3, and e designates 0 or 1 while holding d+e=3}.

On the other hand, the external heating roll 82 is a roll having a built-in heater 821 and made of a metal of a lower (toner) releasing property than that of the heat fixing roll 70, such as a stainless steel or an alumite metal effective for avoiding corrosion.

Moreover, this external heating roll 82 can be brought into and away from contact with the heat fixing roll 70 such that it can come into contact at a warming-up time, for example, to enhance the surface heating efficiency of the heat fixing roll 70.

Moreover, the web cleaner 83 has a less fibrous take-up wet 831 which is fed from one web feed roll 832 and recovered by the other web recovery roll 833.

Especially in this embodiment, the web cleaner 83 is constructed by arranging a first pressure roll 834 on the back side of the web 831 corresponding to the heat fixing roll 70 to press the web 831 onto the heat fixing roll 70 with a predetermined nip width by the first pressure roll 834, and interposing a cleaning roll 835 between the heat fixing roll 70 and the outer surface of the web 831 and arranging a second pressure roll 836 on the back side of the web 831 corresponding to the cleaning roll 835 to push the cleaning roll 835 onto the heat fixing roll 70 with a predetermined nip width by the second pressure roll 836.

Figure 5:
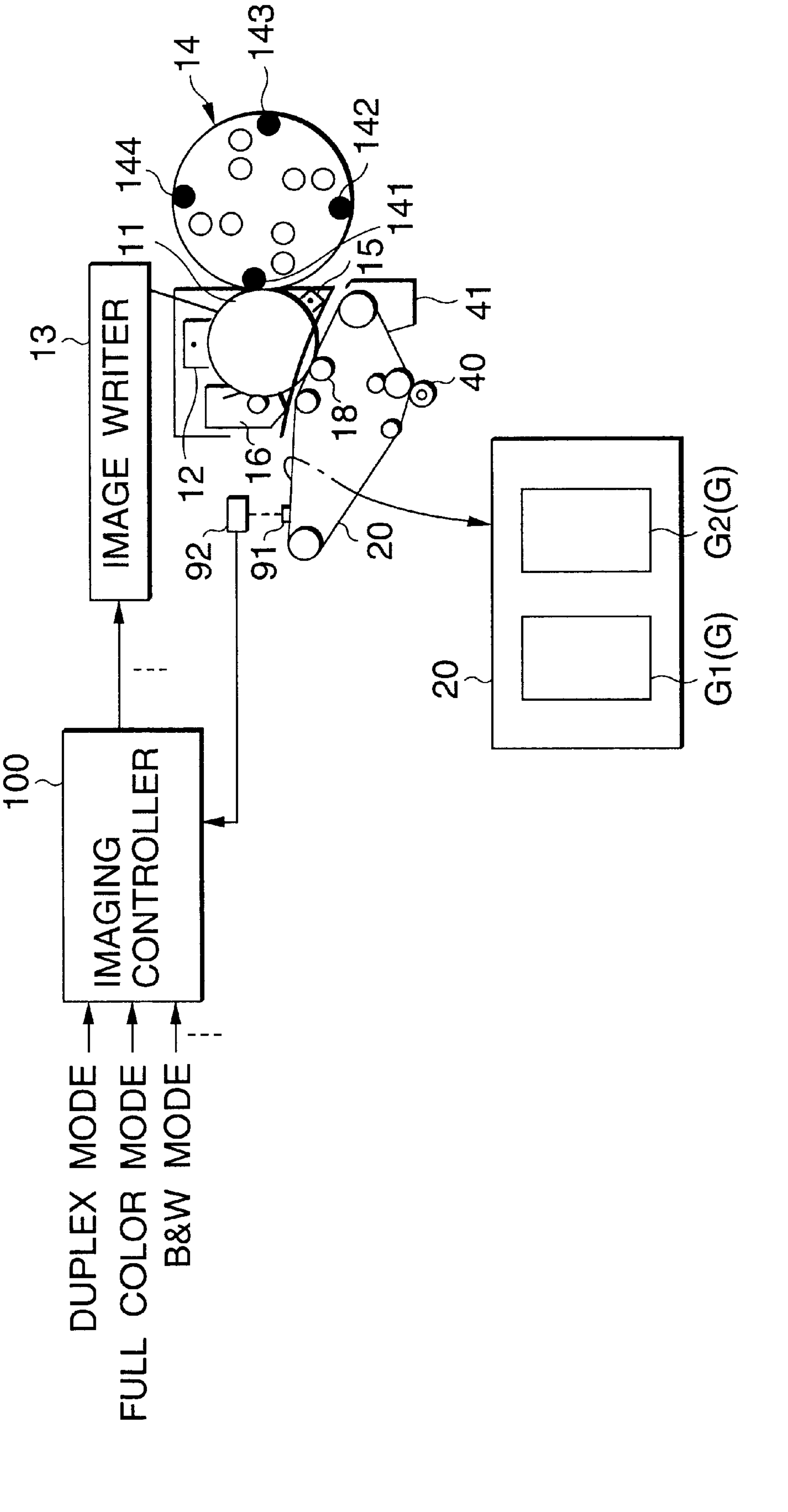
FIG. 5 is a block diagram showing an image control system to be used in Embodiment 1.

In this embodiment, on the other hand, the intermediate transfer belt 20 is provided, as shown in FIG. 5, with a plurality of (e.g., two in this embodiment) image carrying regions G (e.g., G1 and G2) corresponding to the A4 size of Japanese Industrial Standards, for example. In a portion of the region of the intermediate transfer belt 20 other than the image carrying region G, on the other hand, there is formed a reference mark 91 for generating a reference signal. In a manner to correspond to the moving locus of the reference mark 91, a mark sensor 92 is arranged at a predetermined portion apart from the intermediate transfer belt 20.

Here, the reference mark 91 is exemplified by an optical reflector of a high reflectivity or a hole for a light to pass through. On the other hand, the mark sensor 92 may be suitably selected including an optical type, so long as it can detect the reference mark 91.

In this embodiment, moreover, an imaging controller 100 is constructed of a μcomputer system (including CPU, ROM, RAM and I/O port), for example. As shown in FIG. 5, the CPU fetches signals from switches for selecting the various modes such as the duplex mode, the full color mode or the B&W (Black & White) mode and the detection signal from the mark sensor 92 through the I/O port, and executes an imaging program (including an imaging sequence determining algorithm [as shown in FIGS. 6 to 10]), as prestored in the ROM, to feed predetermined control signals through the I/O port to imaging devices including the photosensitive drum 11 and the image writer 13, the intermediate transfer belt 20, the fixing unit 42 and the form conveyor line 50.

Here will be described the imaging process in the duplex mode of the intermediate transfer type duplex imaging apparatus according to this embodiment.

Figure 6:
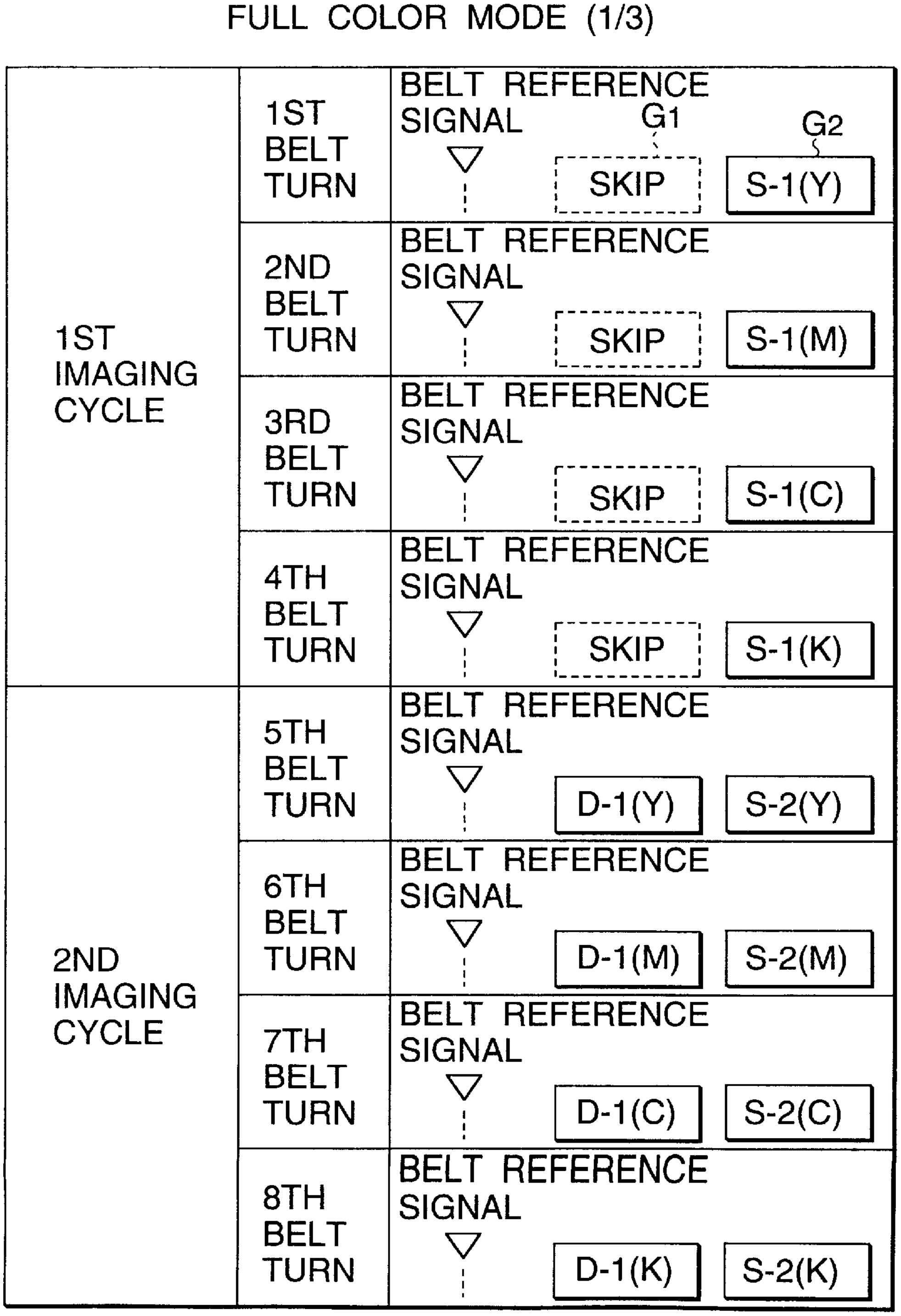
FIG. 6 is an explanatory diagram showing a processing content (1/3) in a full color mode to be used in Embodiment 1.
Figure 7:
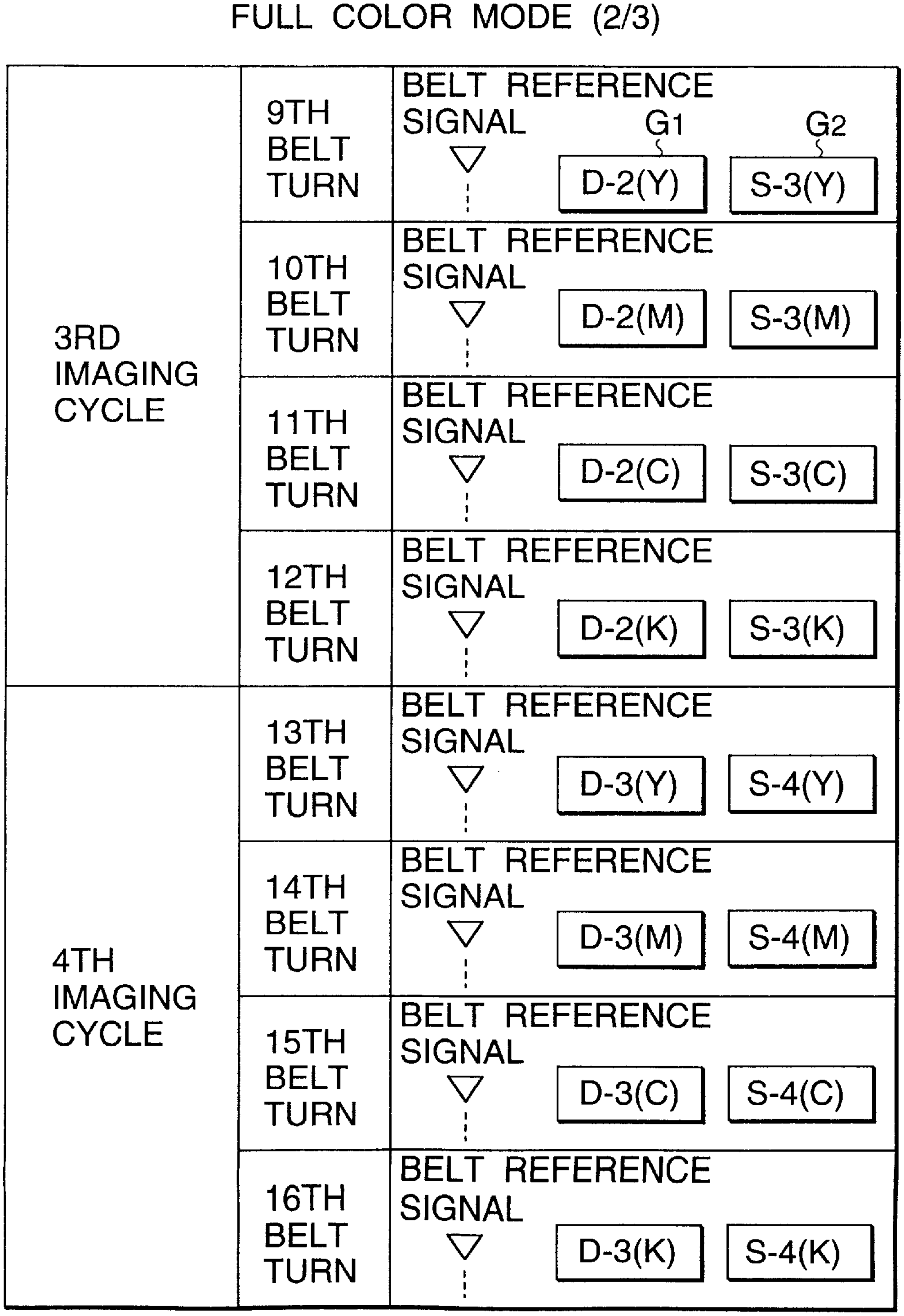
FIG. 7 is an explanatory diagram showing a processing content (2/3) in a full color mode to be used in Embodiment 1.
Figure 8:
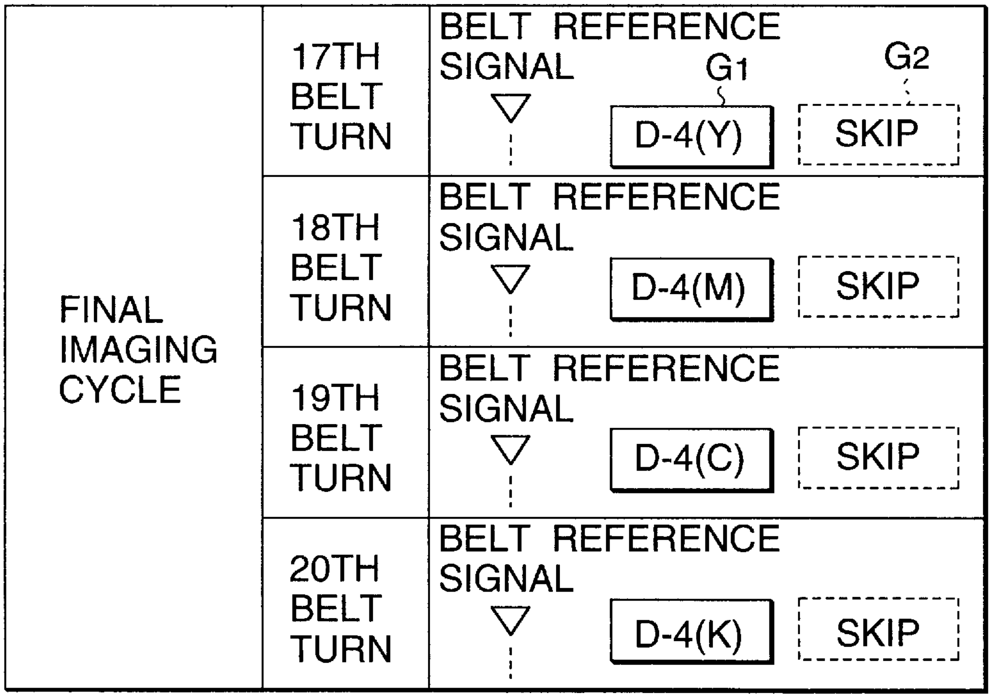
FIG. 8 is an explanatory diagram showing a processing content (3/3) in a full color mode to be used in Embodiment 1.

[Full Color Mode (as shown in FIGS. 6 to 8)]

When the automatic duplex mode and the full color mode are selected, the imaging controller 100 performs the imaging processes in the fundamental imaging sequence shown in FIGS. 6 to 8. Here in FIGS. 6 to 8, there are shown the images which are formed at every rotations of the intermediate transfer belt 20 in each imaging cycle, but there are omitted the images which have already been formed in each imaging cycle.

The fundamental imaging sequence shown in FIGS. 6 to 8 is exemplified for a print number n=4.

In the first imaging cycle (at the first to fourth turns of the intermediate transfer belt), more specifically, the imaging controller 100 skips, at each turn of the intermediate transfer belt 20, the preceding first image carrying region G1 of the intermediate transfer belt 20 on the basis of a belt reference signal (i.e, the detected signal from the mark sensor 92), and then transfers and forms a first screen image S-1 (including individual yellow, magenta, cyan and black color component images S-1(Y), S-1(M), S-1(C) and S-1(K)) of the first form on the succeeding second image carrier region G2.

When the intermediate transfer belt 20 makes four turns, moreover, the first screen image S-1 (or the multiplex transfer images of the individual color component images) of the first form is carried on the second image carrying region G2 of the intermediate transfer belt 20 and is transferred to the first face (or surface) of the first form, thus ending the first imaging cycle.

After this, the form having the transferred image is fixed and is then conveyed again to the secondary transfer portion through the form returning conveyor mechanism 60.

Next, in the second imaging cycle (at the fifth to eighth turns of the intermediate transfer belt), the imaging controller 100 transfers and forms, at each turn of the intermediate transfer belt 20, a second screen image D-1 (including individual yellow, magenta, cyan and black color component images D-1(Y), D-1(M), D-1(C) and D-1(K)) of the first form on the preceding first image carrying region G1 of the intermediate transfer belt 20 on the basis of a belt reference signal, and transfers and forms a first screen image S-2 (including individual yellow, magenta, cyan and black color component images S-2(Y), S-2(M), S-2(C) and S-2(K)) of the second form on the succeeding second image carrier region G2.

When the intermediate transfer belt 20 makes four turns, moreover, the second screen image D-1 (or the multiplex transfer images of the individual color component images) of the first form is carried on the first image carrying region G1 of the intermediate transfer belt 20 whereas the first screen image S-2 (or the multiplex transfer images of the individual color component images) of the second form is carried on the second image carrying region G2, and the two images on the intermediate transfer belt 20 are individually transferred at the secondary transfer portion to the second face (or the back) of the first form and to the first face (or surface) of the second form, thus ending the second imaging cycle.

After this, the two forms having the consecutively transferred images are individually fixed at the fixing unit 42, and the duplexly fixed forms are discharged as they are through the form discharge passage 61 to the not-shown discharge tray whereas the simplexly fixed form is conveyed again through the form returning conveyor mechanism 60 to the secondary transfer portion.

Next, in the third imaging cycle (at the ninth to twelfth turns of the intermediate transfer belt), the imaging controller 100 transfers and forms, at each turn of the intermediate transfer belt 20, a second screen image D-2 (including individual yellow, magenta, cyan and black color component images D-2(Y), D-2(M), D-2(C) and D-2(K)) of the second form on the preceding first image carrying region G1 of the intermediate transfer belt 20 on the basis of a belt reference signal, and transfers and forms a first screen image S-3 (including individual yellow, magenta, cyan and black color component images S-3(Y), S-3(M), S-3(C) and S-3(K)) of the third form on the succeeding second image carrier region G2. After the intermediate transfer belt 20 made four turns, the individual images D-2 and S-3 on the intermediate transfer belt 20 are transferred to the individual corresponding faces of the forms, and the transfers and the form conveyances are then performed as in the second imaging cycle.

Next, in the fourth imaging cycle (at the thirteenth to sixteenth turns of the intermediate transfer belt), the imaging controller 100 transfers and forms, at each turn of the intermediate transfer belt 20, a second screen image D-3 (including individual yellow, magenta, cyan and black color component images D-3(Y), D-3(M), D-3(C) and D-3(K)) of the third form on the preceding first image carrying region G1 of the intermediate transfer belt 20 on the basis of a belt reference signal, and transfers and forms a first screen image S-4 (including individual yellow, magenta, cyan and black color component images S-3(Y), S-4(M), S-4(C) and S-4(K)) of the fourth form on the succeeding second image carrier region G2. After the intermediate transfer belt 20 made four turns, the individual images D-3 and S-4 on the intermediate transfer belt 20 are transferred to the individual corresponding faces of the forms, and the transfers and the form conveyances are then performed as in the second imaging cycle.

In the last imaging cycle (at the seventeenth to twentieth turns of the intermediate transfer belt), moreover, the imaging controller 100 transfers and forms, at each turn of the intermediate transfer belt 20, a second screen image D-4 (including individual yellow, magenta, cyan and black color component images D-4(Y), D-4(M), D-4(C) and D-4(K)) of the fourth form on the preceding first image carrying region G1 of the intermediate transfer belt 20 on the basis of a belt reference signal, and skips the second image carrying region G2.

After the intermediate transfer belt 20 made four turns, moreover, the image D-4 on the intermediate transfer belt 20 is transferred to the corresponding face of the last form and is then fixed by the fixing unit until it is discharged to the not-shown discharge tray.

As a result, the series of processes in the full color mode (or automatic duplex mode) are ended to produce the four duplex color prints.

[B&W (Black & White) Mode (as shown in FIGS. 9 and 10)]

When the automatic duplex mode and the B&W (Black & White) mode are selected, the imaging controller 100 performs the imaging processes in the fast imaging sequence (different from the fundamental imaging sequence shown in FIGS. 6 to 8), as shown in FIGS. 9 and 10.

This fast imaging sequence shown in FIGS. 9 and 10 is exemplified for the print number n=10.

In the first imaging cycle (at the first turn of the intermediate transfer belt), more specifically, the imaging controller 100 transfers and forms, at the first turn of the intermediate transfer belt 20, a first screen image S-1 (e.g., a black color component image S-1(K)) of the first form on the preceding first image carrying region G1 of the intermediate transfer belt 20 on the basis of the belt reference signal (i.e, the detected signal from the mark sensor 92), and then skips the succeeding second image carrier region G2.

When the intermediate transfer belt 20 makes one turn, moreover, the first screen image S-1 (or S-1(K)) of the first form is carried on the first image carrying region G1 of the intermediate transfer belt 20 and is transferred to the first face (or surface) of the first form, thus ending the first imaging cycle. After this the intermediate transfer belt 20 makes one dummy turn (in the dummy cycle).

On the other hand, the form having the transferred image is fixed at the fixing unit 42 and is then conveyed again to the secondary transfer portion through the form returning conveyor mechanism 60.

Here, the dummy cycle of the intermediate transfer belt 20 considers the time period for the form to reach again the secondary transfer portion through the form returning conveyor mechanism 60 and is subsequently timed such that the second screen image is transferred to the form for the image carrying region (G1 or G2).

Next, in the second imaging cycle (at the third turn of the intermediate transfer belt), the imaging controller 100 transfers and forms a first screen image S-2 (e.g., a black color component image S-2(K)) of a second form without using any belt reference signal on the preceding first image carrying region G1 of the intermediate transfer belt 20 on the basis of a suitable timing of the not-shown timer, for example, and transfers and forms a second screen image D-1 (e.g., a black color component image D-1(K)) of a first form on the succeeding second image carrying region G2.

In the full color mode of this embodiment, the individual color component images have to be accurately superposed and transferred on the intermediate transfer belt 20 so that the belt reference signal is used for each turn of the intermediate transfer belt 20. In the B&W mode, however, there is no requirement unlike the full color mode for the superposed transfer of the color component images. Thus, there is adopted a method in which the belt reference signal is used only at firsts but not in and after the second imaging cycle while utilizing the timing of a timer or the like.

When the intermediate transfer belt 20 made one turn, moreover, the first screen image S-2 (S-2(K)) of the second form is carried on the first image carrying region G1 of the intermediate transfer belt 20, and the second screen image D-1 (D-1(K)) of the first form is carried on the second image carrying region G2, so that they are transferred to the corresponding faces of the individual forms. After this second imaging cycle was ended, the intermediate transfer belt 20 makes one dummy turn.

On the other hand, the forms having the transferred images are individually fixed at the fixing unit 42 so that the simplexly fixed form is conveyed again to the secondary transfer portion through the form returning conveyor mechanism 60 whereas the duplexly fixed form is discharged as it is to the not-shown discharge tray through the form discharge passage 61.

Next, in the third imaging cycle (at the fifth turn of the intermediate transfer belt), the imaging controller 100 transfers and forms, as in the second imaging cycle, a first screen image S-3 (e.g., a black color component image S-3(K)) of a third form on the preceding first image carrying region G1 of the intermediate transfer belt 20 on the basis of a suitable timing of the not-shown timer, for example, and transfers and forms a second screen image D-2 (e.g., a black color component image D-2(K)) of a second form on the succeeding second image carrying region G2.

When the intermediate transfer belt 20 made one turn, moreover, the individual images S-3 (S-3(k), D-2 (D-2(K)), as carried on the intermediate transfer belt 20, are transferred to the corresponding faces of the individual forms, thus ending the third imaging cycle. The forms having the transferred images are individually fixed at the fixing unit 42 and are then conveyed as in the second imaging cycle.

Next, in the fourth imaging cycle (at the sixth turn of the intermediate transfer belt), the imaging controller 100 transfers and forms, as in the second imaging cycle, a first screen image S-4 (e.g., a black color component image S-4(K)) of a fourth form on the preceding first image carrying region G1 of the intermediate transfer belt 20 on the basis of a suitable timing of the not-shown timer, for example, and skips the succeeding second image carrying region G2.

When the intermediate transfer belt 20 made one turn, moreover, the images S-4 (S-4(k)), as carried on the intermediate transfer belt 20, is transferred to the corresponding face of the form, thus ending the fourth imaging cycle. The form having the transferred image is fixed at the fixing unit 42 and is then conveyed again to the secondary transfer portion through the form returning conveyor mechanism 60.

After this, in the fifth imaging cycle (at the seventh turn of the intermediate transfer belt), the imaging controller 100 skips, as in the second imaging cycle, the preceding first image carrying region G1 of the intermediate transfer belt 20 on the basis of a suitable timing of the not-shown timer, for example, and transfers and forms a second screen image D-3 (e.g., a black color component image D-3(K)) of a third form on the succeeding second image carrying region G2.

When the intermediate transfer belt 20 made one turn, moreover, the image D-3 (D-3(k)), as carried on the intermediate transfer belt 20, is transferred to the corresponding face of the form, thus ending the fifth imaging cycle. The form having the transferred image is fixed at the fixing unit 42 and is then discharged to the not-shown discharge tray through the form discharge passage 61.

In "the sixth imaging cycle, the dummy cycle to the ninth imaging cycle" and in "the tenth imaging cycle, the dummy cycle to the thirteenth imaging cycle", moreover, the imaging processes are sequentially performed to correspond to those in "the second imaging cycle, the dummy cycle to the fifth imaging cycle" so that the processes of a second screen image D-9 (D-9(K)) of a ninth form are ended.

After this, in the last imaging cycle (at the eighteenth turn of the intermediate transfer belt), the imaging controller 100 skips the preceding first image carrying region G1 of the intermediate transfer belt 20 on the basis of a suitable timing of the not-shown timer, for example, and transfers and forms a second screen image D-10 (e.g., a black color component image D-10(K)) of a tenth form on the succeeding second image carrying region G2.

When the intermediate transfer belt 20 made one turn, moreover, the image D-10 (D-10(k)), as carried on the intermediate transfer belt 20, is transferred to the corresponding face of the form, thus ending the last imaging cycle. The form having the transferred image is fixed at the fixing unit 42 and is then discharged to the not-shown discharge tray through the form discharge passage 61.

As a result, the series of processes in the B&W mode (or automatic duplex mode) are ended to produce the ten duplex monochromatic prints.

[Oil Feeding Conditions of Fixing unit]

For the imaging process thus far described, this embodiment set the following oil feeding conditions for the fixing unit 42.

First of all, the fixing unit 42 to be used in this embodiment was tested on its fundamental performances.

The tests were performed by making ten idle turns of the heat fixing roll 70 and the pressure fixing roll 72 of the fixing unit 42 in contact, by feeding the fixing unit 42 with a continuous form of four doubled continuous paper sheets of A3 size of Japanese Industrial Standards, and by measuring the oil rates of the individual fixing rolls 70 and 72. The test results are presented in FIG. 11.

Here, the fixing unit 42 used in the tests was constructed to make two turns within the length of the A3 form. In the tests, the heat fixing roll 70 was fed with the oil from the oil feeder 81, but the pressure fixing roll 72 was not fed with the oil because it had no gap between the forms.

Figure 11:
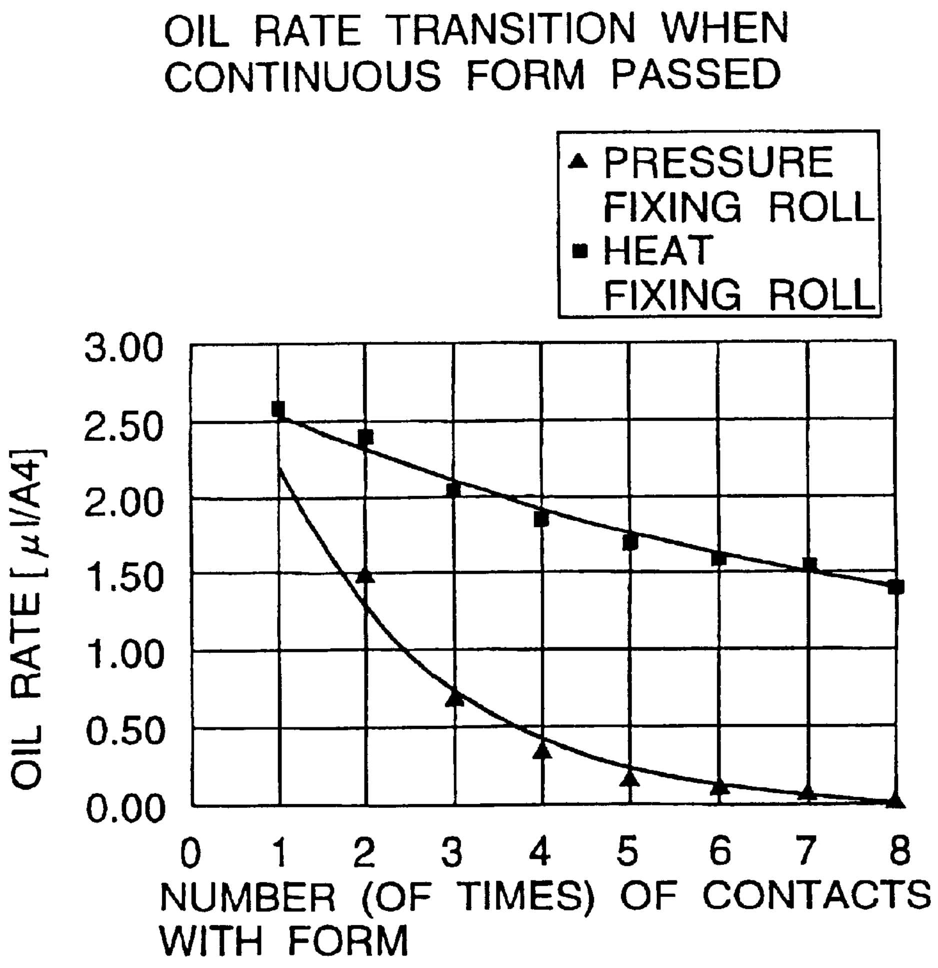
FIG. 11 is a graph plotting an oil rate transition at a passing time of a continuous form in connection with the fixing unit to be used in Embodiment 1.

It has been confirmed from FIG. 11 that at the time of eight contacts with the forms, the oil rate on the side of the heat fixing roll 70 dropped to about 1 microliter per A4 (i.e., per the A4 size of Japanese Industrial Standards) whereas the oil rate on the side of the pressure fixing roll 72 dropped to substantial 0.

On the other hand, the transitions of the amount of oil applied from the heat fixing roll 70 to the pressure fixing roll 72 were examined by turning the heat fixing roll 70 and the pressure fixing roll 72 idly in contact from the state of the eight contacts of the oil rate transition tests when the continuous form was passed. The results are presented in FIG. 12.

Figure 12:
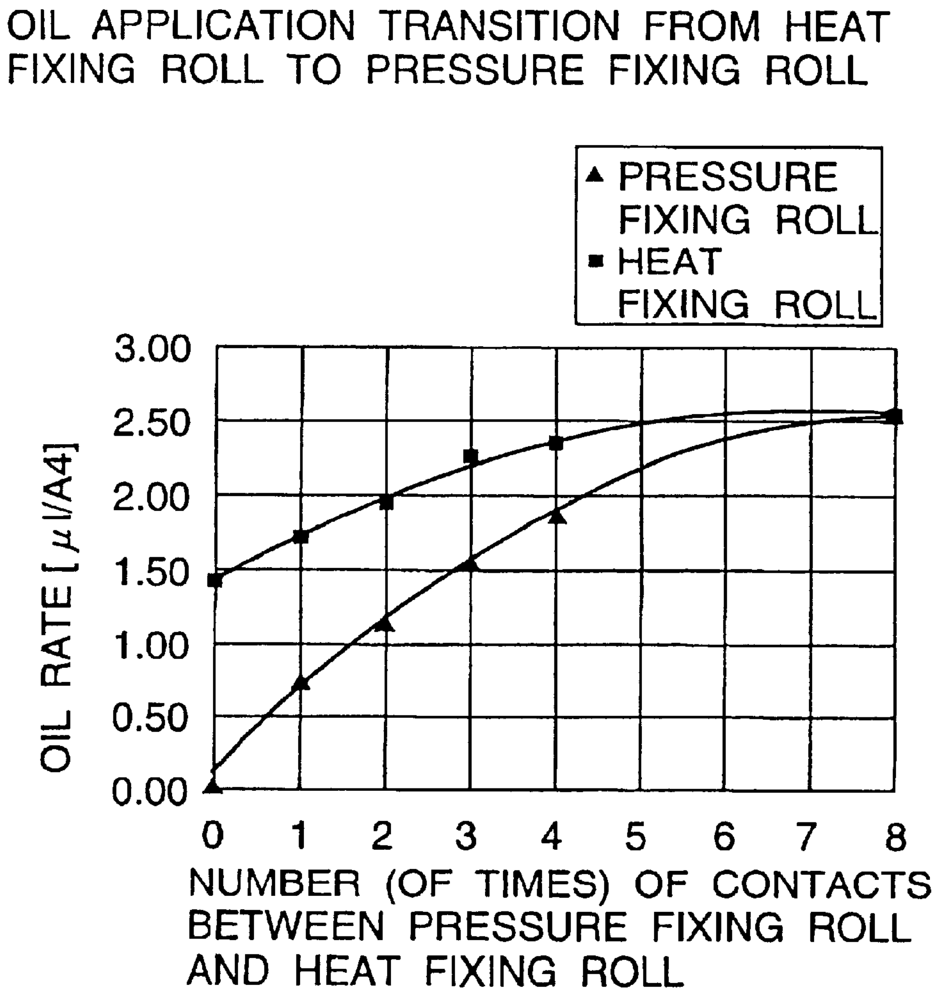
FIG. 12 is a graph plotting an oil application transition from a heat fixing roll to a pressure fixing roll in connection with the fixing unit to be used in Embodiment 1.

It has been confirmed from FIG. 12 that at the time of the eight contacts between the two fixing rolls 70 and 72, the oil rate of about 0 of the pressure fixing roll 72 restored the initial one (e.g., 2.6 microliter per A4 in this embodiment) of the heat fixing roll 70.

When the second (or back) face is to be fixed, on the other hand, the fixed image of the first (or surface) face of the form comes into contact with the pressure fixing roll 72. If the oil as the releasing agent on the side of the pressure fixing roll 72 is then little, the form may be rolled up on the pressure fixing roll 72, or the fixed image may be offset.

Therefore, the temperatures of the pressure fixing roll (P/R) 72, at which a heterogeneous solution occurred in the fixed full color image, were examined by changing the oil amount (i.e., the oil rate of the pressure fixing roll 72) for the form (e.g., the A3 form of Japanese Industrial Standards) carrying the fixed full color image. The results are presented in FIG. 13.

Figure 13:
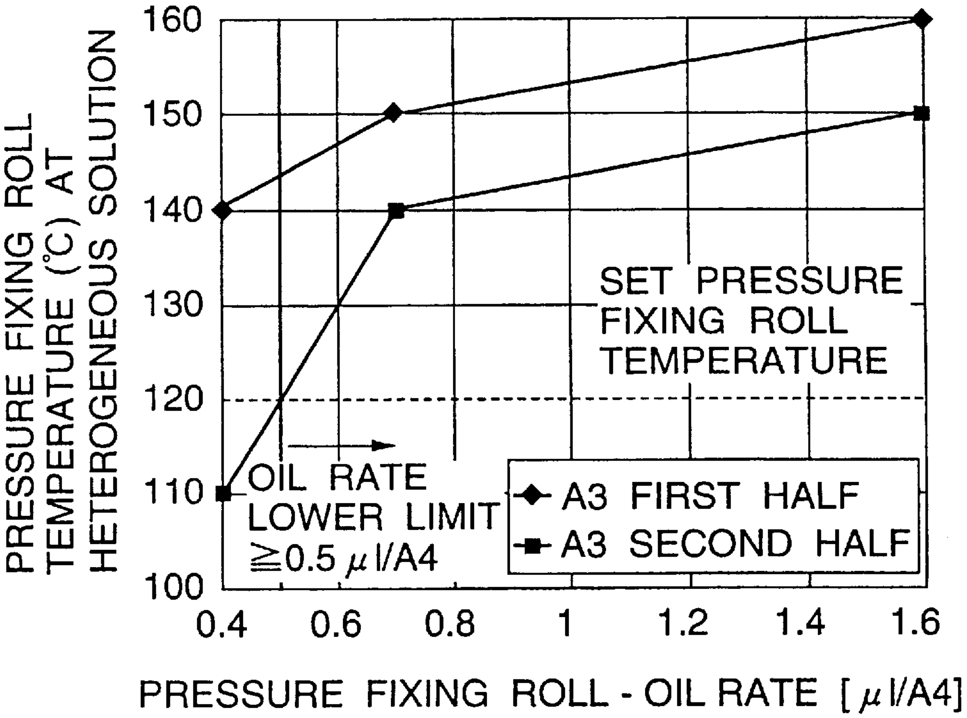
FIG. 13 is a graph plotting relations between a form oil and a pressure fixing roll temperature at a heterogeneous solution in connection with the fixing unit to be used in Embodiment 1.

It has been grasped from FIG. 13 that the lower limit of the oil rate on the side of the pressure fixing roll 72 was preferably at 0.5 microliter per A4 or less if the pressure fixing roll 72 had a set temperature of 120° C., and that the oil rate on the side of the pressure fixing roll 72 was preferably at 0.7 microliter per A4 or more if a dispersion of about 20° C. was considered in the set temperature of the pressure fixing roll 72.

On the other hand, the so-called "oil ghost phenomenon" may occur if the oil amount on the side of the pressure fixing roll 72 at the time of fixing the image of the first (or surface) face is excessive.

In this embodiment, therefore, a consecutive run was made at first in the automatic duplex mode to examine the relations among the print number, the oil amount difference (Kcps/ϕ30) on the intermediate transfer belt, and the density difference (ΔD). The results are presented in FIG. 14.

Here, the test conditions were exemplified by setting the sum of the oil rate on the heat fixing roll 70 and the oil rate on the pressure fixing roll 72 to 8 microliter per A4, and by making the tests individually in the stress mode (where 100 identical forms were passed, for example) and in the ordinary use mode (where six kinds of originals (of fourteen sets, for example) having an average area coverage of 20% were passed repeatedly three times). Here in FIG. 14, a straight line, as drawn by a dotted line, indicates one approximating the oil amount difference on the intermediate transfer belt individually in the stress mode and in the ordinary use mode, whereas a straight line, as drawn by a solid line, indicates one approximating the density difference in the individual modes.

Figure 14:
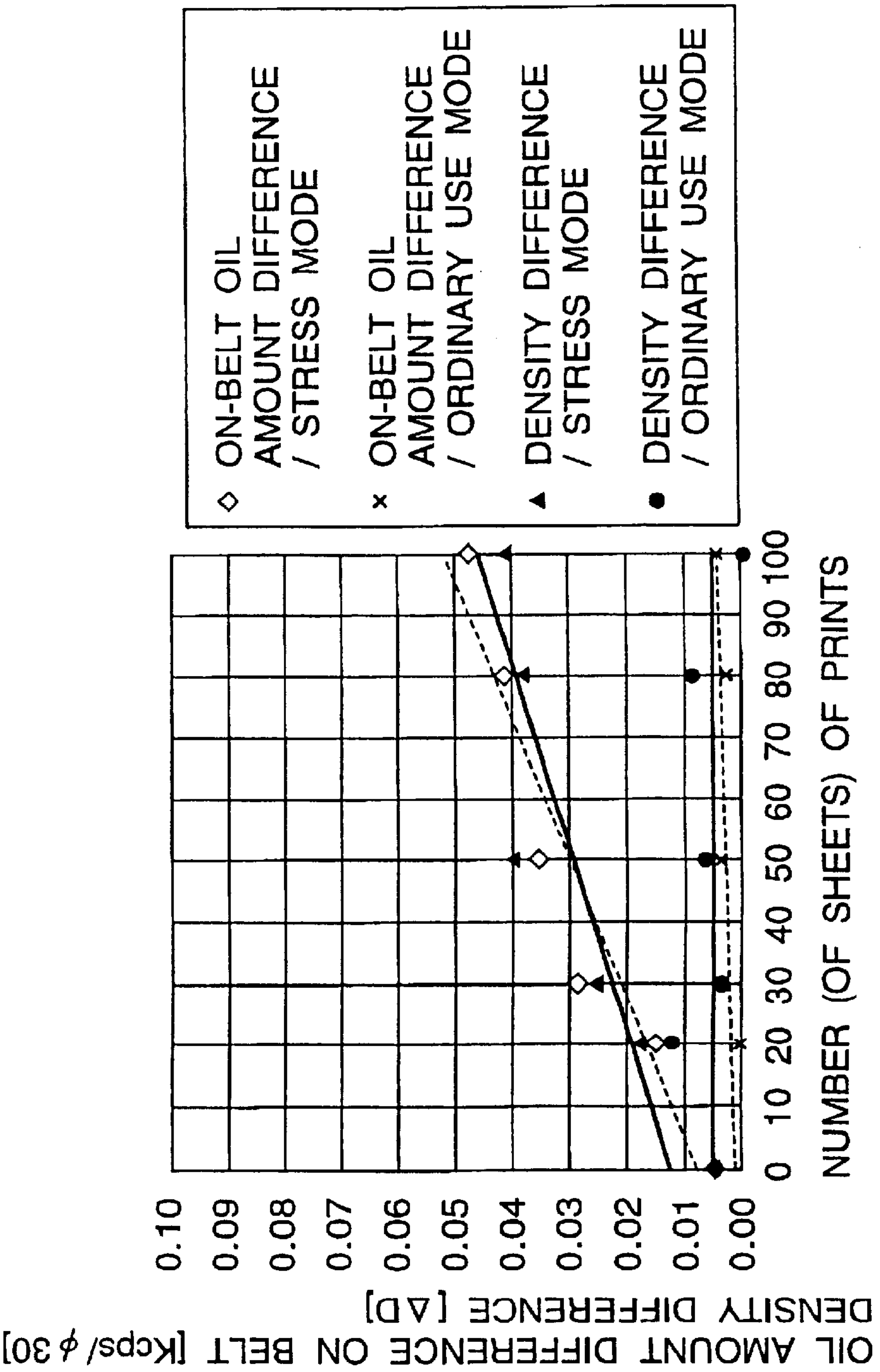
FIG. 14 is a graph plotting a relation between a number of prints and an amount difference on an intermediate transfer belt, and a relation between a number of prints and an oil ghost (or density difference) in connection with the fixing unit to be used in Embodiment 1.

In FIG. 14, blanks (or oil ghosts) were visually found for a density difference of 0.03 or more.

Here, it has been found that the oil amount difference and the density difference on the intermediate transfer belt little changed in the ordinary use mode to present no oil ghost, but that the density difference exceeded 0.03 in the stress mode over for the print number over fifty to present the oil ghost.

In this situation, the relations among the oil amount of the pressure fixing roll 72, the oil amount difference (Kcps/ϕ30) on the intermediate transfer belt, and the density difference (ΔD) were examined in the aforementioned stress mode. The results are presented in FIG. 15. Here, in FIG. 15, the straight line, as drawn by a dotted line, indicates one approximating the oil amount difference on the intermediate transfer belt, wherein the straight line, as drawn by a solid line, indicates one approximating the density difference.

Figure 15:
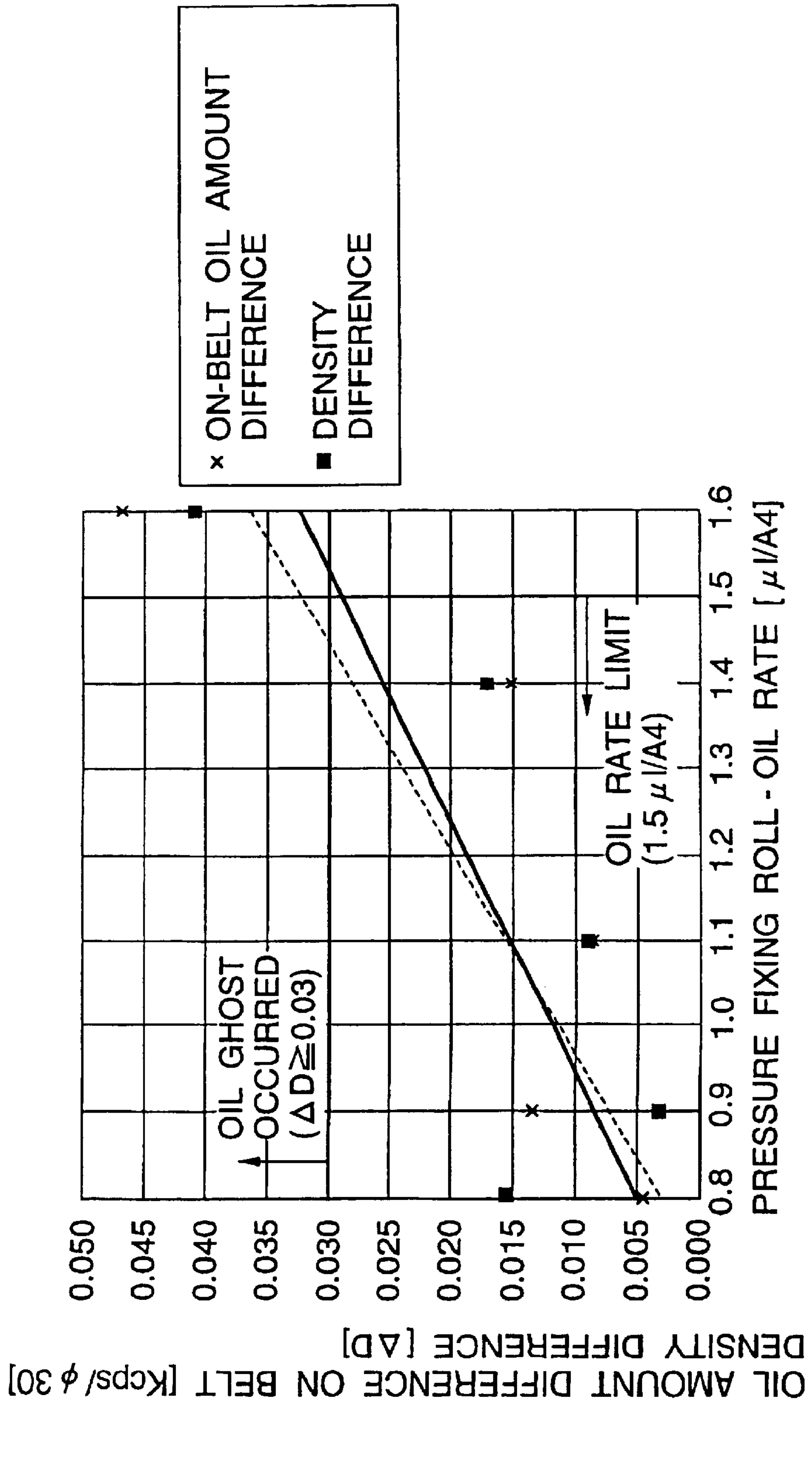
FIG. 15 is a graph plotting a relation between an oil amount of the pressure fixing roll and an amount difference on an intermediate transfer belt, and a relation between a number of prints and an oil ghost (or density difference) in connection with the fixing unit to be used in Embodiment 1.

It is understood from FIG. 15 that the oil rate of the pressure fixing roll 72 was required to be at 1.5 microliter per A4 or less for causing no oil ghost in the aforementioned stress mode because the density difference took the value of 0.03 or more around the time when the oil rate of the pressure fixing roll 72 exceeded 1.5 microliter per A4.

Here, in the ordinary use mode, it has been confirmed that no oil ghost was found when the oil rate of the pressure fixing roll 72 was at 3.0 microliter per A4 or less.

In the aforementioned full color mode (or automatic duplex mode), therefore, the oil amount to be transferred to the back of the form when the first screen image is fixed has to be adjusted not to be excessively fed, so as to eliminate the heterogeneous solution or the like or the oil ghost.

In this embodiment, the second screen image is formed in the first image carrying region G1 of the intermediate transfer belt 20 in and after the second imaging cycle. In this embodiment, therefore, the oil feed of the oil feeder 81 may be so set at the time of fixing the second image that the oil rate on the side of the pressure fixing roll 72 may be at about 3.0 microliter per A4 or less, desirably at 0.7 microliter per A4 to 1.5 microliter per A4.

Especially in this embodiment, the fixing unit 42 is required for fixing two forms consecutively. For this requirement, the oil feed of the oil feeder 81 has to be set while considering the absorption of the amount of oil by the preceding form and the aforementioned oil amount.

In this embodiment, on the other hand, only one form is passed through the fixing unit 42 in the first imaging cycle. As a result, the oil amount to be transferred to the back of the form at the first screen image fixing time becomes more than that in and after the second imaging cycle so that the oil transfer to the intermediate transfer belt 20 becomes accordingly more. However, no problem arises on the oil ghost, because the oil mount increases only once in the imaging process of a plurality of forms but the oil transfer to the intermediate transfer belt 20 can be suppressed in another imaging process.

As a matter of fact, according to this embodiment, neither the heterogeneous solution nor the oil ghost was found in the full color mode (or automatic duplex mode).

In the B&W mode (or automatic duplex mode), on the other hand, there is adopted not the fundamental imaging sequence such as the full color mode but the fast imaging sequence (as selected for the productivity as the first priority), as shown in FIGS. 9 and 10.

At this time, the first screen image is always formed in the first image carrying region G1 so that the oil, as transferred to the back of the form, is more transferred to the intermediate transfer belt 20 than that of the full color mode.

In the case of the B&W mode, however, not only the span for the form to pass through the fixing unit 42 but also the span for the form to pass through the secondary transfer portion of the intermediate transfer belt 20 is shorter than that of the case of the full color mode. As a result, the oil transfer to the form is not so much, but the oil having been transferred to the intermediate transfer belt 20 is effectively absorbed by the form, thereby to hardly invite a fear that the excessive oil is transferred to the intermediate transfer belt 20.

Here in this embodiment, the second image carrying region G2 is employed as the portion for forming the first screen image in the first imaging cycle of the full color mode but may be replaced by the first image carrying region G1.

In the B&W mode, on the other hand, the fast imaging sequence is adopted, but the fundamental imaging sequence may be adopted as in the full color mode.

[Embodiment 2]

Figure 16:
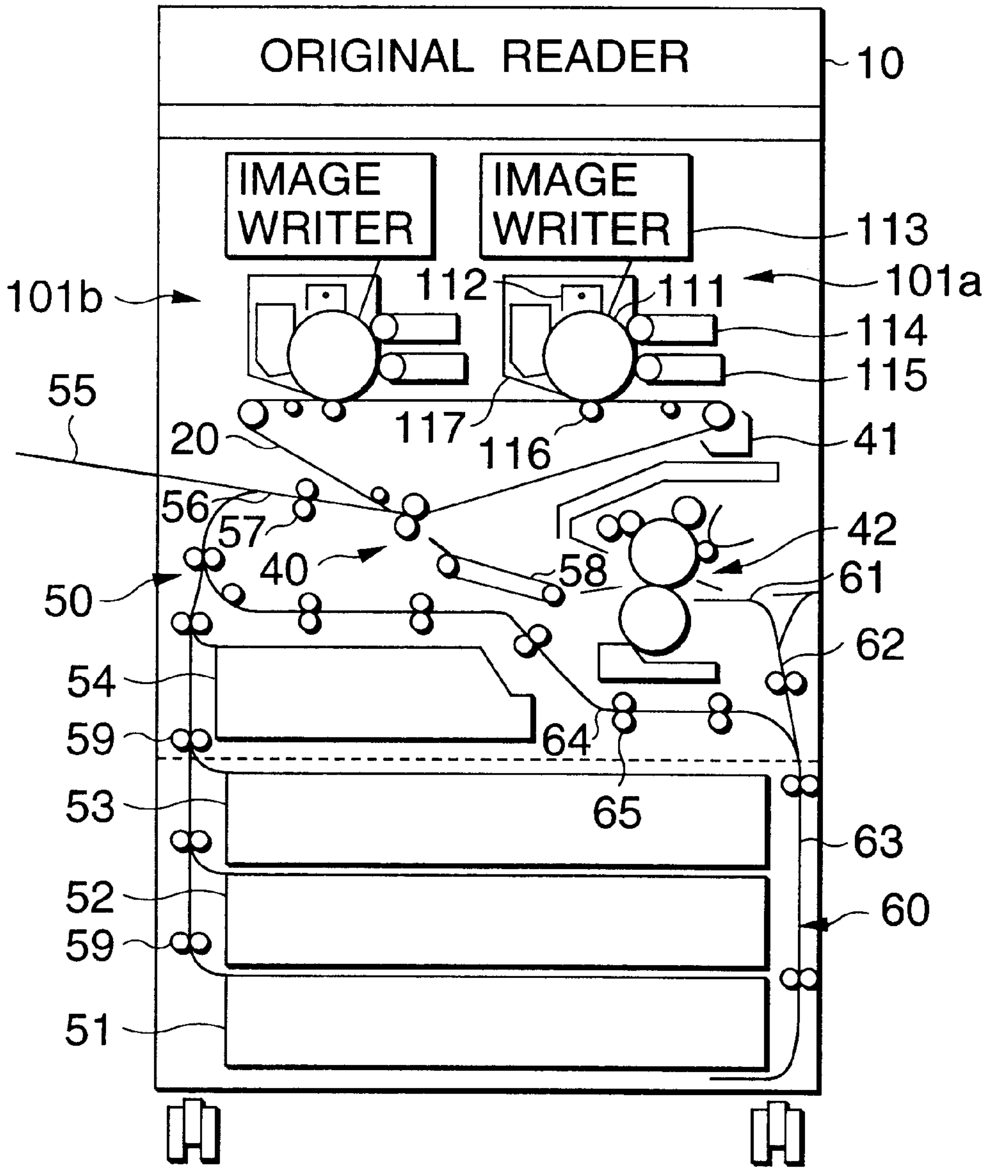
FIG. 16 is an explanatory diagram showing a summary of a duplex imaging apparatus according to Embodiment 2.

FIG. 16 shows Embodiment 2, in which the invention is applied to a two-tandem type duplex imaging apparatus.

The duplex imaging apparatus, as shown, is constructed substantially likewise Embodiment 1 but is different from Embodiment 1 in that imaging units 101 (e.g., 101*a* and 101*b*) of an electronic photography type, for example, for forming two color component toner images, respectively, are arranged in parallel with the intermediate transfer belt 20, so that the two color component toner images, as consecutively formed by the individual imaging units 101, are consecutively transferred to the intermediate transfer belt 20 and are then transferred wholly (or secondarily) by the secondary transfer device 40.

Here, each of the imaging units 101 is equipped with a photosensitive drum 111, a charger 112, an image writer 113, two developers 114 and 115, a primary transferor 116 and a drum cleaner 117.

Here, the components similar to those of Embodiment 1 will be omitted in their detailed description by designating them by reference numerals similar to those of Embodiment 1.

Figure 17:
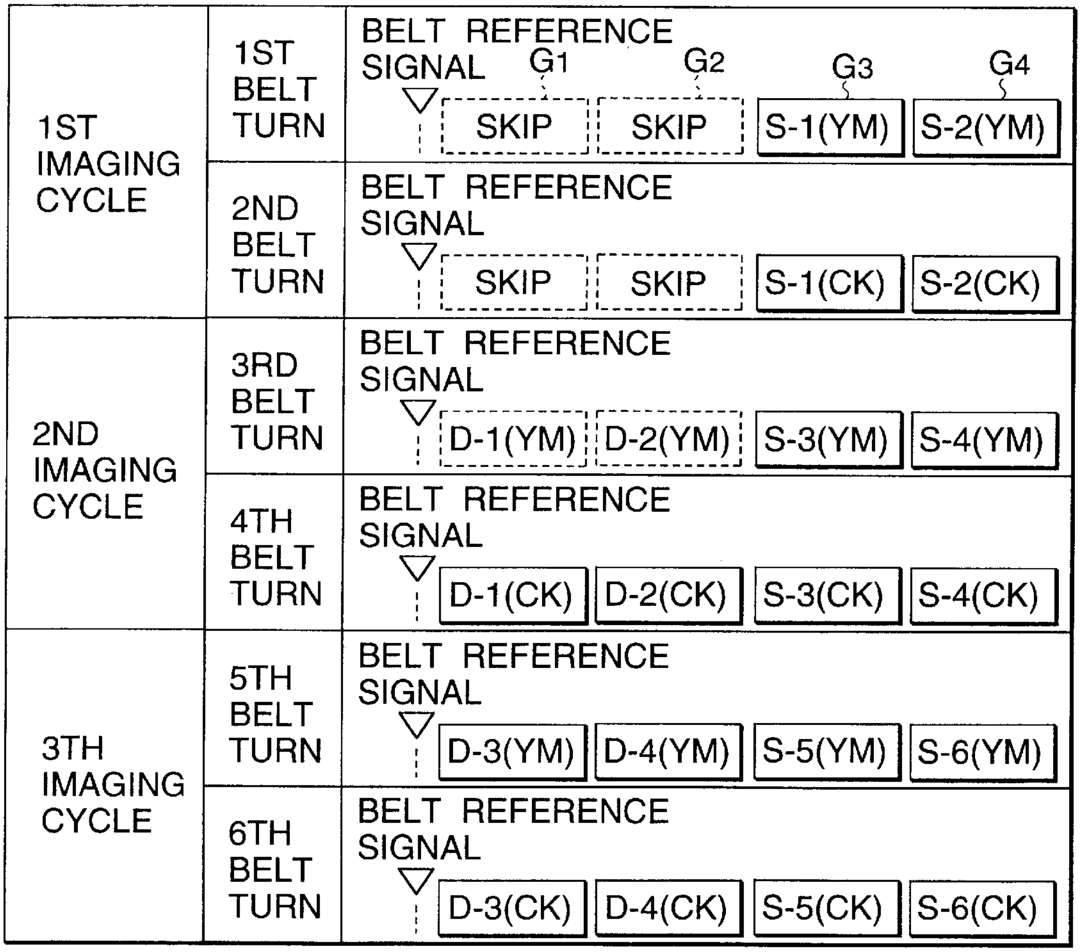
FIG. 17 is an explanatory diagram showing a processing content (1/2) in a full color mode to be used in Embodiment 2.

In this embodiment, on the other hand, the intermediate transfer belt 20 is equipped, unlike Embodiment 1, with four image carrying regions G (i.e., G1, G2, G3 and G4, as shown in FIG. 17) corresponding to the A4 size of Japanese Industrial Standards, so that the imaging in the full color mode at the automatic duplex mode time is executed in accordance with the fundamental imaging sequence, as shown in FIGS. 17 and 18.

For the A3 size, the intermediate transfer belt 20 is equipped with the two image carrying regions G so that the fundamental imaging sequence is similar to that of FIGS. 6 to 8.

In this embodiment, moreover, the fundamental imaging sequence may be adopted for the imaging in the B&W mode at the automatic duplex mode time. From a viewpoint similar to that of Embodiment 1, however, there is adopted a fast imaging sequence (as selected for the productivity as the first priority) which is different from the fundamental imaging sequence.

Here will be described the imaging process in the full color mode at the duplex mode time of the tandem type duplex imaging apparatus according to this embodiment.

When the automatic duplex mode and the full color mode are selected, the imaging controller 100 performs its imaging processes in the fundamental imaging sequence shown in FIGS. 17 and 18. Here in FIGS. 17 and 18, the image to be formed at the individual turns of the intermediate transfer belt 20 in the individual imaging cycles are presented, but the images having already been formed in the individual imaging cycles are omitted.

The fundamental imaging sequence shown in FIGS. 17 and 18 is exemplified for the print number n=8.

In the first imaging cycle (at the first and second turns of the intermediate transfer belt), more specifically, the imaging controller 100 skips, at each turn of the intermediate transfer belt 20, the preceding first and second image carrying regions G1 and G2 of the intermediate transfer belt 20 on the basis of a belt reference signal (i.e, the detected signal from the mark sensor 92), and then transfers and forms a first screen image S-1 (including yellow and magenta superposed color component image S-1(YM) and cyan and black superposed color component image S-1(CK)) of the first form on the succeeding third image carrier region G3 and further a first screen image S-2 (including yellow and magenta superposed color component image S-2(YM) and cyan and black superposed color component image S-2(CK)) of the second form on the succeeding fourth image carrier region G4.

When the intermediate transfer belt 20 makes the second turns, moreover, the first screen image S-1 (or the multiplex transfer image of the individual color component images) of the first form is carried on the third image carrying region G3 of the intermediate transfer belt 20, and the first screen image S-2 (or the multiplex transfer image of the individual color component images) of the second form is carried on the fourth image carrying region G4. These individual images are transferred to the first faces (or surfaces) of the first and second forms, thus ending the first imaging cycle.

After this, the forms having the transferred images are fixed and are then conveyed again to the secondary transfer portion through the form returning conveyor mechanism 60.

Next, in the second imaging cycle (at the third and fourth turns of the intermediate transfer belt), the imaging controller 100 transfers and forms, at each turn of the intermediate transfer belt 20, a second screen image D-1 (including yellow and magenta superposed color component image D-1(YM) and cyan and black superposed color component image D-1(CK)) of the first form on the preceding first image carrying region G1 of the intermediate transfer belt 20 on the basis of a belt reference signal, transfers and forms a second screen image D-2 (including yellow and magenta superposed color component image D-2(YM) and cyan and black superposed color component image D-2(CK)) of the second form on the succeeding second image carrying region G2, transfers and forms a first screen image S-3 (including yellow and magenta superposed color component image S-3(YM) and cyan and black superposed color component image S-3(CK)) of the third form on the succeeding third image carrying region G3, and transfers and forms a first screen image S-4 (including yellow and magenta superposed color component image S-4(YM) and cyan and black superposed color component image S-4(CK)) of the fourth form on the succeeding fourth image carrying region G4.

When the intermediate transfer belt 20 makes two turns, moreover, the second screen image D-1 (or the multiplex transfer images of the individual color component images) of the first form is carried on the first image carrying region G1 of the intermediate transfer belt 20 whereas the second screen image D-2 (or the multiplex transfer images of the individual color component images) of the second form is carried on the second image carrying region G2, and further the first screen images S-3 and S-4 (or the multiplex transfer images of the individual color component images) of the third and fourth forms are carried on the third image carrying region G3 and the fourth image carrying region G4. The four images on the intermediate transfer belt 20 are individually transferred at the secondary transfer portion to the second faces (or the backs) of the first and second forms and to the first faces (or surfaces) of the third and fourth forms, thus ending the second imaging cycle.

After this, the four forms having the consecutively transferred images are individually fixed at the fixing unit 42, and the duplexly fixed forms are discharged as they are through the form discharge passage 61 to the not-shown discharge tray whereas the simplexly fixed form is conveyed again through the form returning conveyor mechanism 60 to the secondary transfer portion.

Next, in the third imaging cycle (at the fifth and sixth turns of the intermediate transfer belt), processes are made as in the second imaging cycle. On the individual image carrying regions G1 to G4 of the intermediate transfer belt 20, there are carried second screen images D-3 (e.g., D-3(YM) and D-3(CK)) and D-4 (e.g., D-4(YM) and D-4(CK)) of the third and fourth forms, and first screen images S-5 (e.g., S-5(YM) and S-5(CK)) and S-6 (e.g., S-6(YM) and S-6(CK)) of the fifth and sixth forms. After the intermediate transfer belt 20 made two turns, the four images (or the multiplex transfer images of the individual color component images) on the intermediate transfer belt 20 are individually transferred at the secondary transfer portion to the second faces (or backs) of the third and fourth forms and to the first faces (or surfaces) of the fifth and sixth forms, thus ending the third imaging cycle. From now on, similar fixing processes and form conveying processes are performed.

Next, in the fourth imaging cycle (at the seventh and eighth turns of the intermediate transfer belt), processes are made as in the second imaging cycle. On the individual image carrying regions G1 to G4 of the intermediate transfer belt 20, there are carried second screen images D-5 (e.g., D-5(YM) and D-5(CK)) and D-6 (e.g., D-6(YM) and D-6 (CK)) of the fifth and sixth forms, and first screen images S-7 (e.g., S-7(YM) and S-7(CK)) and S-8 (e.g., S-8(YM) and S-8(CK)) of the seventh and eighth forms. After the intermediate transfer belt 20 made two turns, the four images (or the multiplex transfer images of the individual color component images) on the intermediate transfer belt 20 are individually transferred at the secondary transfer portion to the second faces (or backs) of the fifth and seventh forms and to the first faces (or surfaces) of the seventh and eighth forms, thus ending the fourth imaging cycle. From now on, similar fixing processes and form conveying processes are performed.

In the last imaging cycle (at the ninth and tenth turns of the intermediate transfer belt), moreover, the imaging controller 100 transfers and forms, at each turn of the intermediate transfer belt 20, a second screen image D-7 (e.g., D-7(YM) and D-7(CK)) of the seventh form on the preceding first image carrying region G1 of the intermediate transfer belt 20 on the basis of a belt reference signal and further a second screen image D-8 (e.g., D-8(YM) and D-8(CK)) of the eighth form on the succeeding second image carrying region G2, and skips the succeeding third image carrying region G3 and fourth image carrying region G4.

After the intermediate transfer belt 20 made two turns, moreover, the images D-7 and D-8 on the intermediate transfer belt 20 are transferred to the corresponding faces of the individual forms and are then fixed by the fixing unit until they are discharged to the not-shown discharge tray.

As a result, the series of processes in the full color mode (or automatic duplex mode) are ended to produce the eight duplex color prints.

In this embodiment, on the other hand, the oil feeding conditions of the fixing unit 42 at the time of the imaging process thus far described were examined to acquire conclusions similar to those of Embodiment 1.

In this embodiment, the second screen image is formed in or before the second image carrying region G2 of the intermediate transfer belt 20 in and after the second imaging cycle. In this embodiment, therefore, the oil feed of the oil feeder 81 may be so set at the time of fixing the second image that the oil rate on the side of the pressure fixing roll 72 may be at about 3.0 microliter per A4 or less, desirably at 0.7 microliter per A4 to 1.5 microliter per A4.

Especially in this embodiment, the fixing unit 42 is required for fixing four forms consecutively. For this requirement, the oil feed of the oil feeder 81 has to be set while considering the absorption of the amount of oil by the preceding form and the aforementioned oil amount.

In this embodiment, on the other hand, only two forms are passed through the fixing unit 42 in the first imaging cycle. As a result, the oil amount to be transferred to the back of the form at the first screen image fixing time becomes more than that in and after the second imaging cycle so that the oil transfer to the intermediate transfer belt 20 becomes accordingly more. However, no problem arises on the oil ghost, because the oil mount increases only once in the imaging process of a plurality of forms but the oil transfer to the intermediate transfer belt 20 can be suppressed in another imaging process.

As a matter of fact, according to this embodiment, neither the heterogeneous solution nor the oil ghost was found in the full color mode (or automatic duplex mode).

Here in this embodiment, the first screen images are formed on the third image carrying region G3 and the fourth image carrying region G4. Alternatively, however, the first screen images may be formed on any two of the four image carrying regions G1 to G4 such that they are formed on the first image carrying region G1 and the second image carrying region G2.

[Embodiment 3]

Figure 19:
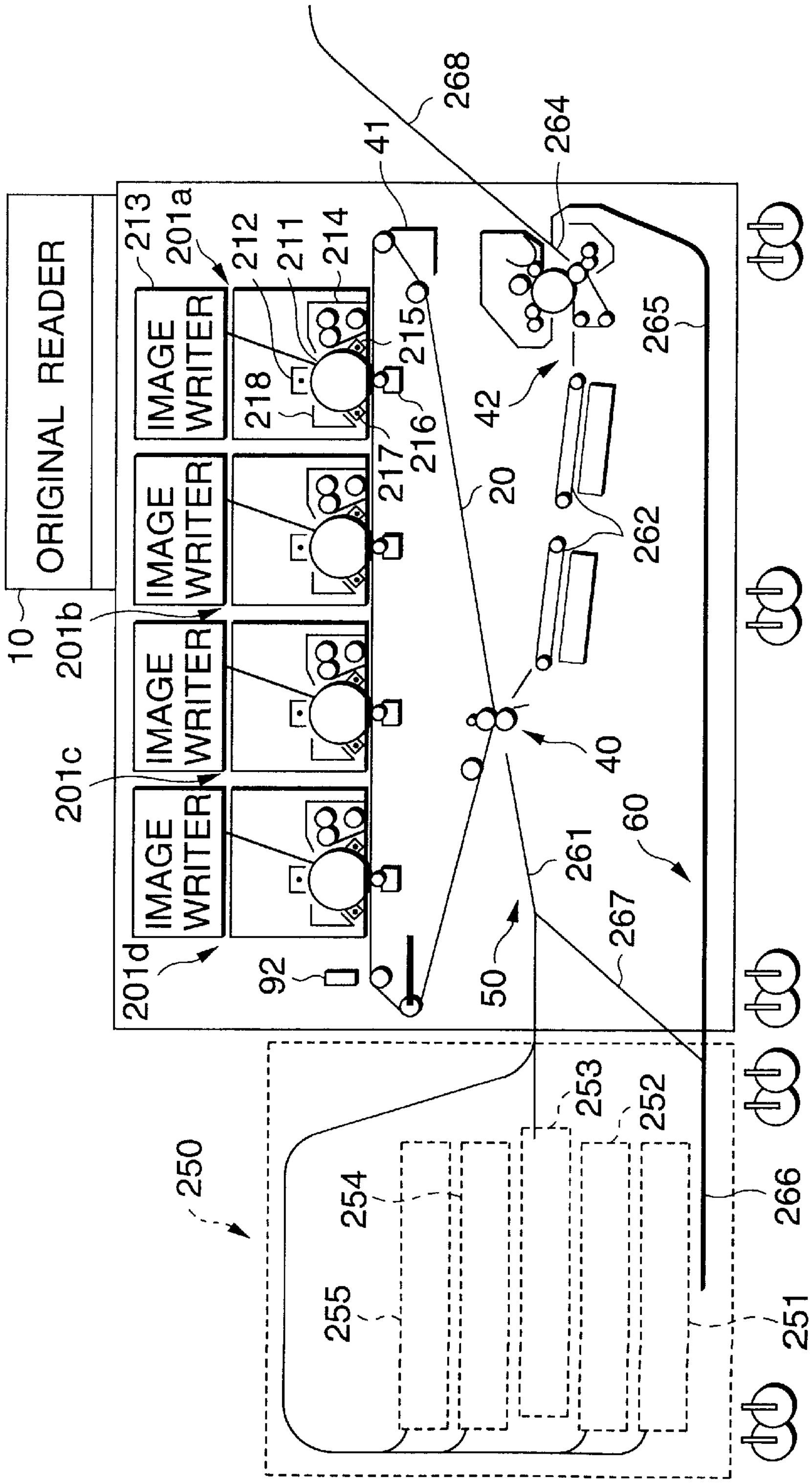
FIG. 19 is an explanatory diagram showing a summary of a duplex imaging apparatus according to Embodiment 3.

FIG. 19 shows Embodiment 3, in which the invention is applied to a four-tandem type duplex imaging apparatus.

The duplex imaging apparatus, as shown, is constructed substantially likewise Embodiment 1 but is different from Embodiment 1 in that imaging units 201 (e.g., 201*a* , 201*b*, 201*c* and 201*d*) of an electronic photography type, for example, for forming color component toner images, respectively, are arranged in parallel with the intermediate transfer belt 20, so that the color component toner images, as consecutively formed by the individual imaging units 201, are consecutively transferred to the intermediate transfer belt 20 and are then transferred wholly (or secondarily) by the secondary transfer device 40.

Here, each of the imaging units 201 is equipped with a photosensitive drum 211, a charger 212, an image writer 213, a developer 214, a pre-transfer charger 215, a primary transferor 216, a cleaner pre-static eliminator 217 and a drum cleaner 218.

Here, the components similar to those of Embodiment 1 will be omitted in their detailed description by designating them by reference numerals similar to those of Embodiment 1.

In this embodiment, on the other hand, the dual imaging apparatus is externally provided with a form feed unit 250 housing a plurality of form trays 251 to 255. The form conveyor line 50 is constructed to guide the forms, as delivered from the form feed unit 250, to a secondary transfer portion via a form passage 261, to convey the secondarily transferred forms to the fixing unit 42 (of the belt nip type in this embodiment) via a dual conveyor belt 262, and to invert the simplexly fixed forms and return them again to the secondary transfer portion through the form returning conveyor mechanism 60.

This form returning conveyor mechanism 60 is constructed by providing a form branching passage 265 branched downward from a form discharge passage 264 with respect to the fixing unit 42 and extending generally horizontally toward the paper feed unit 250, by providing a form inverting passage 266 leading to the form branching passage 265 in the form feed unit 250, and by connecting a form returning passage 267 from the form inverting passage 266 to the form passage 261 just upstream of the secondary transfer position.

Here, the not-shown registration roll is disposed at a predetermined position of the form passage 261, each of which is provided with the not-shown conveyor roll. Especially, the conveyor belt, as disposed in the form inverting passage 266, is turned back and forth at a suitable timing. On the other hand, each passage is provided at its junction with a (not-shown) switch gate, if necessary.

Figure 20:
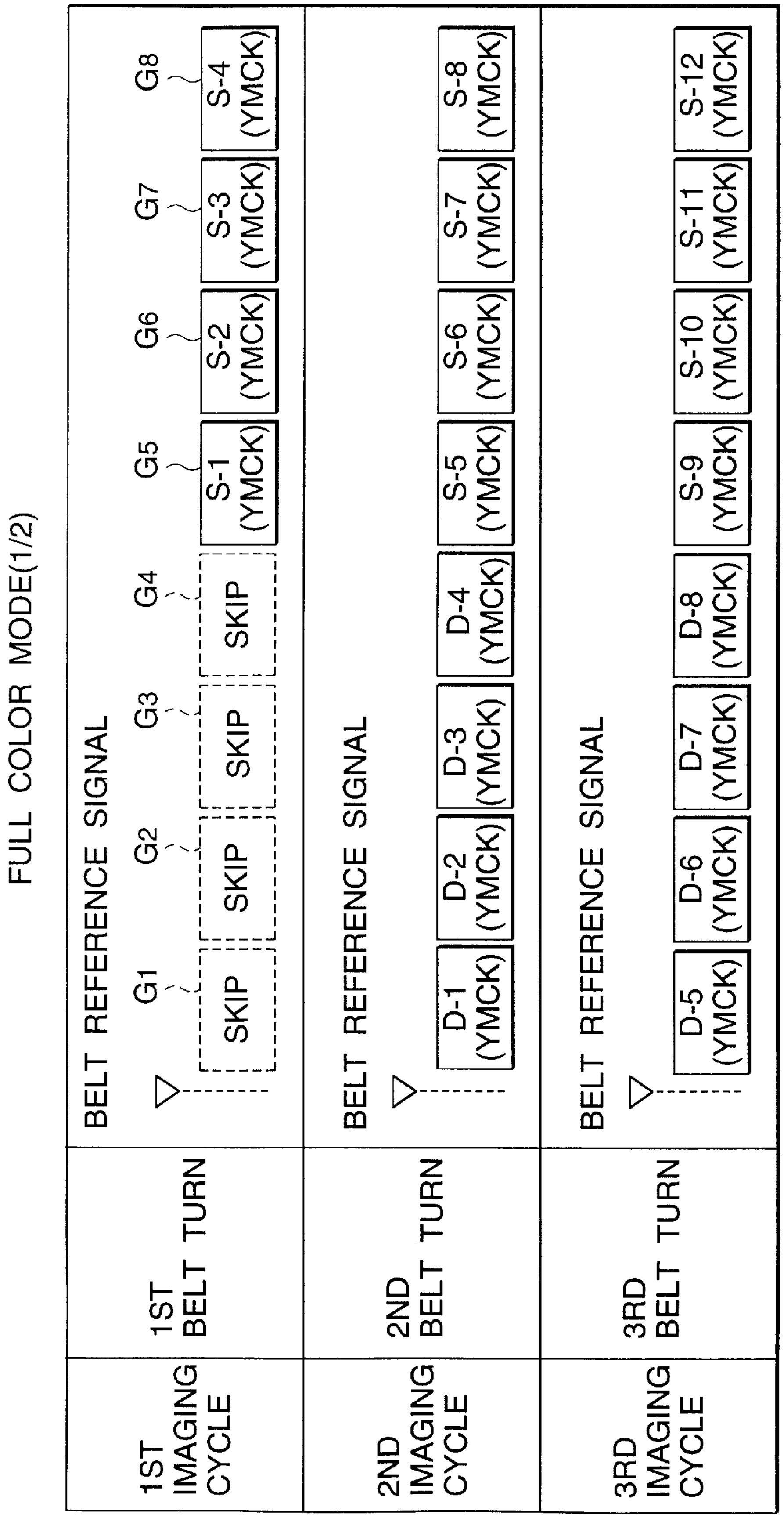
FIG. 20 is an explanatory diagram showing a processing content (1/2) in a full color mode to be used in Embodiment 3.
Figure 21:
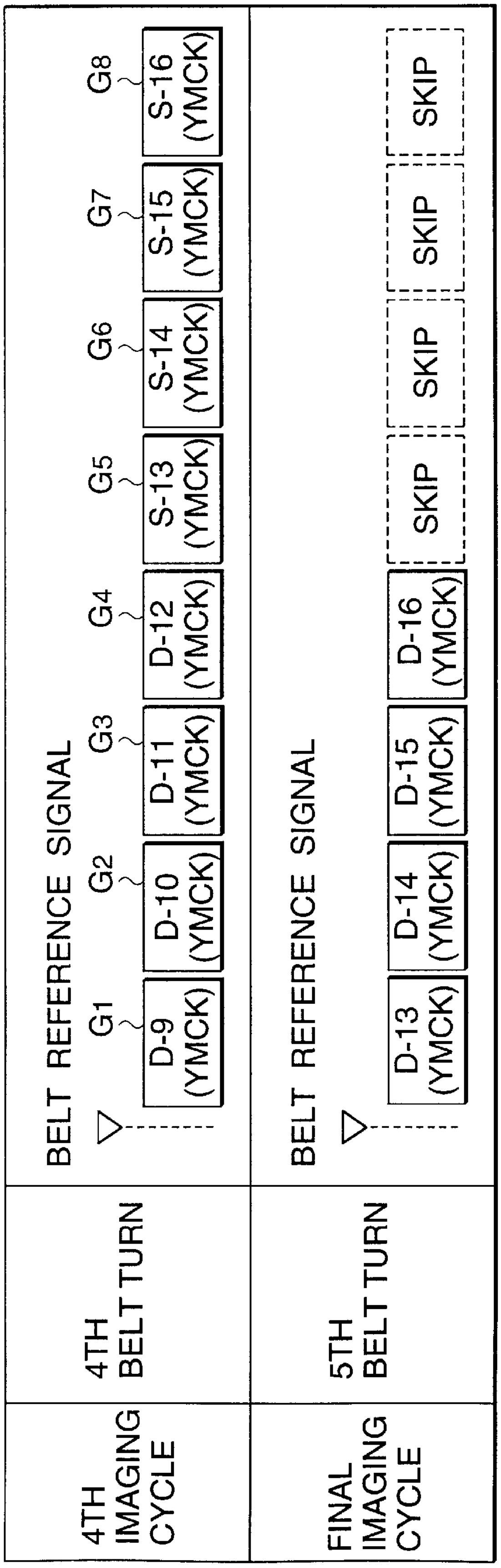
FIG. 21 is an explanatory diagram showing a processing content (2/2) in a full color mode to be used in Embodiment 3.

In this embodiment, on the other hand, the intermediate transfer belt 20 is equipped, unlike Embodiment 1, with eight image carrying regions G (i.e., G1, G2, G3, G4, G5, G6, G7 and G8, as shown in FIGS. 20) corresponding to the A4 size of Japanese Industrial Standards, so that the imaging in the full color mode at the automatic duplex mode time is executed in accordance with the fundamental imaging sequence, as shown in FIGS. 20 and 21.

For imaging in the B&W mode at the automatic duplex mode, moreover, this embodiment adopts the fundamental imaging sequence but may naturally adopt another method.

Here will be described the imaging process in the full color mode at the four-duplex mode time of the tandem type duplex imaging apparatus according to this embodiment.

When the automatic duplex mode and the full color mode are selected, the imaging controller 100 performs its imaging processes in the fundamental imaging sequence shown in FIGS. 20 and 21.

The fundamental imaging sequence shown in FIGS. 20 and 21 is exemplified for the print number n=16.

In the first imaging cycle (at the first turn of the intermediate transfer belt), more specifically, the imaging controller 100 skips the preceding first to fourth image carrying regions G1 to G4 of the intermediate transfer belt 20 on the basis of a belt reference signal (i.e, the detected signal from the mark sensor 92) accompanying the turns of the intermediate transfer belt 20, and then transfers and forms a first screen image S-1 (including individual yellow, magenta, cyan and black color component image S-1(YMCK) of the first form on the succeeding fifth image carrier region G5, a first screen image S-2 (including individual yellow, magenta, cyan and black color component image S-2 (YMCK) of the second form on the succeeding sixth image carrier region G6, and further first screen image S-3 (e.g., S-3(YMCK) and S-4 (e.g., S-4(YMCK)) of the third and fourth forms on the succeeding third image carrier region G3 and fourth image carrying region G4.

When the intermediate transfer belt 20 makes one turn, moreover, the individual screen images S-1 to S-4 carried on the fifth to eighth image carrying regions G5 to G8 of the intermediate transfer belt 20 are transferred to the first faces (or surfaces) of the first to fourth forms, thus ending the first imaging cycle.

After this, the forms having the transferred images are fixed and are then conveyed again to the secondary transfer portion through the form returning conveyor mechanism 60.

Next, in the second imaging cycle (at the second turn of the intermediate transfer belt), the imaging controller 100 transfers and forms a second screen image D-1 (including individual yellow, magenta, cyan and black color component image D-1(YMCK) of the first form on the preceding first image carrying region G1 of the intermediate transfer belt 20 on the basis of a belt reference signal accompanying each turn of the intermediate transfer belt 20, and second screen images D-2 (e.g., D-2(YMCK)), D-3 (e.g., D-3(YMCK)) and D-4 (e.g., D-4 (YMCK)) of the second to fourth forms on the succeeding second image carrying region G2 to fourth image carrying region G4, further a first screen image D-5 (e.g., D-5(YMCK)) of the fifth form on the succeeding fifth image carrying region G5, and first screen images S-6 (e.g., S-6(YMCK)) to S-8 (e.g., S-8(YMCK) of the fifth to eighth forms on the succeeding sixth image carrying region G6 to eighth image carrying region G8.

When the intermediate transfer belt 20 makes one turn, moreover, the second screen images D-1 (i.e., D-1(YMCK)) to D-4 (e.g., D-4(YMCK)) of the first to fourth forms are carried on the first image carrying region G1 to the fourth image carrying region G4 of the intermediate transfer belt 20 whereas the first screen images S-5 (i.e., S-5(YMCK)) to S-8 (e.g., S-8(YMCK)) of the fifth to eighth forms are carried on the fifth image carrying region G5 to the eighth image carrying region G8. At the individual secondary transfer portion, the images D-1 to D-4 are individually transferred to the second faces (or the backs) of the first to fourth forms, and the images S-5 to S-8 are transferred to the first faces (or surfaces) of the fifth to eighth forms, thus ending the second imaging cycle.

After this, the eight forms having the consecutively transferred images are individually fixed at the fixing unit 42, and the duplexly fixed forms are discharged as they are through the form discharge passage 264 to a discharge tray 268 whereas the simplexly fixed form is conveyed again through the form returning conveyor mechanism 60 to the secondary transfer portion.

Next, in the third imaging cycle (at the third turn of the intermediate transfer belt), processes are made as in the second imaging cycle. On the individual image carrying regions G1 to G8 of the intermediate transfer belt 20, there are carried second screen images D-5 (e.g., D-5(YMCK)) to D-8 (e.g., D-8 (YMCK) ) of the fifth to eighth forms, and first screen images S-9 (e.g., S-9(YMCK) to S-12 (e.g., S-12(YMCK)) of the ninth to twelfth forms. After the intermediate transfer belt 20 made one turn, at the secondary transfer portion, the D-5 to D-8 on the intermediate transfer belt 20 are transferred to the second faces (or backs) of the fifth to eighth forms, and the S-9 to S-12 are individually transferred to the first faces (or surfaces) of the ninth to twelfth forms, thus ending the third imaging cycle. From now on, similar fixing processes and form conveying processes are performed.

Next, in the fourth imaging cycle (at the fourth turn of the intermediate transfer belt), processes are made as in the second imaging cycle. Second screen images D-9 (e.g., D-9(YMCK)) to D-12 (e.g., D-12(YMCK)) of the ninth to twelfth forms, are carried on the individual image carrying regions G1 to G4 of the intermediate transfer belt, and first screen images S-13 (e.g., S-13(YMCK)) to S-16 (e.g., S-16(YMCK)) of the thirteenth to sixteenth forms are carried on the individual image carrying regions G5 to G8. After the intermediate transfer belt 20 made one turn, at the secondary transfer portion, the D-9 to D-12 on the intermediate transfer belt 20 are transferred to the second faces (or backs) of the ninth to twelfth forms, and the S-13 to S-16 are individually transferred to the first faces (or surfaces) of the thirteenth to sixteenth forms, thus ending the fourth imaging cycle. From now on, similar fixing processes and form conveying processes are performed.

In the last imaging cycle (at the fifth turn of the intermediate transfer belt), moreover, the imaging controller 100 transfers and forms a second screen image D-13 (e.g., D-13(YMCK) to D-16(YMCK)) of the thirteenth to sixteenth forms on the preceding first image carrying region G1 to fourth image carrying region G4 of the intermediate transfer belt 20 on the basis of a belt reference signal accompanying the turn of the intermediate transfer belt 20, and skips the succeeding individual image carrying regions G3 to G8.

After the intermediate transfer belt 20 made one turn, moreover, the images D-13 and D-16 on the intermediate transfer belt 20 are transferred to the corresponding faces of the individual forms and are then fixed by the fixing unit until they are discharged to the not-shown discharge tray.

As a result, the series of processes in the full color mode (or automatic duplex mode) are ended to produce the sixteen duplex color prints.

In this embodiment, on the other hand, the oil feeding conditions of the fixing unit 42 at the time of the imaging process thus far described were examined to acquire conclusions similar to those of Embodiment 1.

In this embodiment, the second screen image is form ed in or before the fourth image carrying region G4 of the intermediate transfer belt 20 in and after the second imaging cycle. In this embodiment, therefore, the oil feed of the oil feeder 81 may be so set at the time of fixing the second image that the oil rate on the side of the pressure fixing roll 72 may be at about 3.0 microliter per A4 or less, desirably at 0.7 microliter per A4 to 1.5 microliter per A4.

Especially in this embodiment, the fixing unit 42 is required for fixing eight forms consecutively. For this requirement, the oil feed of the oil feeder 81 has to be set while considering the absorption of the amount of oil by the preceding form and the aforementioned oil amount.

In this embodiment, on the other hand, only four forms are passed through the fixing unit 42 in the first imaging cycle. As a result, the oil amount to be transferred to the back of the form at the first screen image fixing time becomes more than that in and after the second imaging cycle so that the oil transfer to the intermediate transfer belt 20 becomes accordingly more. However, no problem arises on the oil ghost, because the oil mount increases only once in the imaging process of a plurality of forms but the oil transfer to the intermediate transfer belt 20 can be suppressed in another imaging process.

As a matter of fact, according to this embodiment, neither the heterogeneous solution nor the oil ghost was found in the full color mode (or automatic duplex mode).

Here in this embodiment, the first screen images are formed on the fifth image carrying region G5 to the eighth image carrying region G8. Alternatively, however, the first screen images may be formed on any four of the eight image carrying regions G1 to G8 such that they are formed on the first image carrying region G1 to the eighth image carrying region G8.

Figure 22:
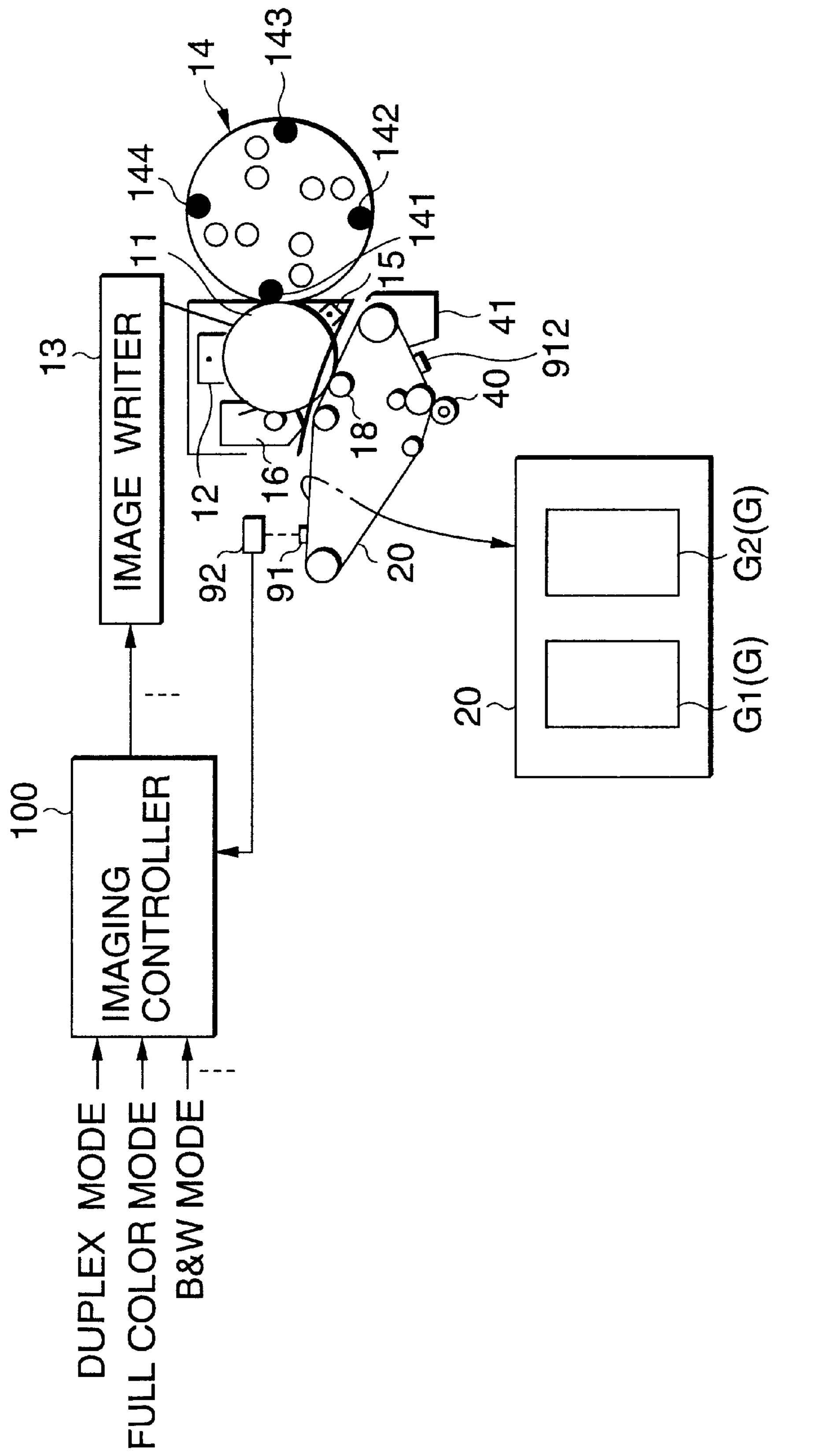
FIG. 22 is an explanatory diagram showing an essential portion of a duplex imaging apparatus according to Embodiment 4.

FIG. 22 shows an essential portion of an intermediate transfer type duplex imaging apparatus to which the invention is applied.

In FIG. 22, the fundamental construction of the intermediate transfer type duplex imaging apparatus is substantially similar to that of Embodiment 1, and is adopted in the situations where it is difficult to execute the first to last imaging cycles consecutively, as when the form returning conveyor passage of the form returning conveyor mechanism 60 has to be set long or when the form feeding rate cannot be adjusted (or accelerated) for a cause such as an increase in cost in the form returning conveyor passage. Thus, this embodiment is different from Embodiment 1 in the structure of generating the reference signal from the intermediate transfer belt 20 and in the imaging process (in the full color mode of the duplex mode) by the imaging controller 100. Here, the components similar to those of Embodiment 1 will be omitted in their detailed description by designating them by reference numerals similar to those of Embodiment 1.

In this embodiment, more specifically, the intermediate transfer belt 20 is provided, as shown in FIG. 22, with a plurality of (e.g., two in this embodiment) image carrying regions G (e.g., G1 and G2) corresponding to the A4 size of Japanese Industrial Standards, for example. In a portion of the region of the intermediate transfer belt 20 other than the image carrying region G (G1 and G2), there are formed two reference marks 911 and 912 for generating two reference signals. In a manner to correspond to the moving locus of the reference marks 911 and 912, a mark sensor 92 is arranged at a predetermined portion apart from the intermediate transfer belt 20.

Here, these reference marks 911 and 912 are exemplified by an optical reflector of a high reflectivity or a hole for a light to pass through. On the other hand, the mark sensor 92 may be suitably selected including an optical type, so long as it can detect the reference marks 911 and 912.

In this embodiment, moreover, an imaging controller 100 is constructed of a $\mu$computer system (including CPU, ROM, RAM and I/O port), for example. As shown in FIG. 22, the CPU fetches signals from switches for selecting the various modes such as the duplex mode, the full color mode or the B&W (Black & White) mode and the detection signal from the mark sensor 92 through the I/O port, and executes an imaging program (including an imaging sequence determining algorithm [as shown in FIG. 23 and FIGS. 24 to 26]), as prestored in the ROM, to feed predetermined control signals through the I/O port to imaging devices including the photosensitive drum 11 and the image writer 13, the intermediate transfer belt 20, the fixing unit 42 and the form conveyor line 50 (as shown in FIG. 3).

Here will be described the imaging process in the duplex mode of the intermediate transfer type duplex imaging apparatus according to this embodiment.

[Full Color Mode (as shown in FIG. 23 and FIGS. 24 to 26)]

Figure 23:
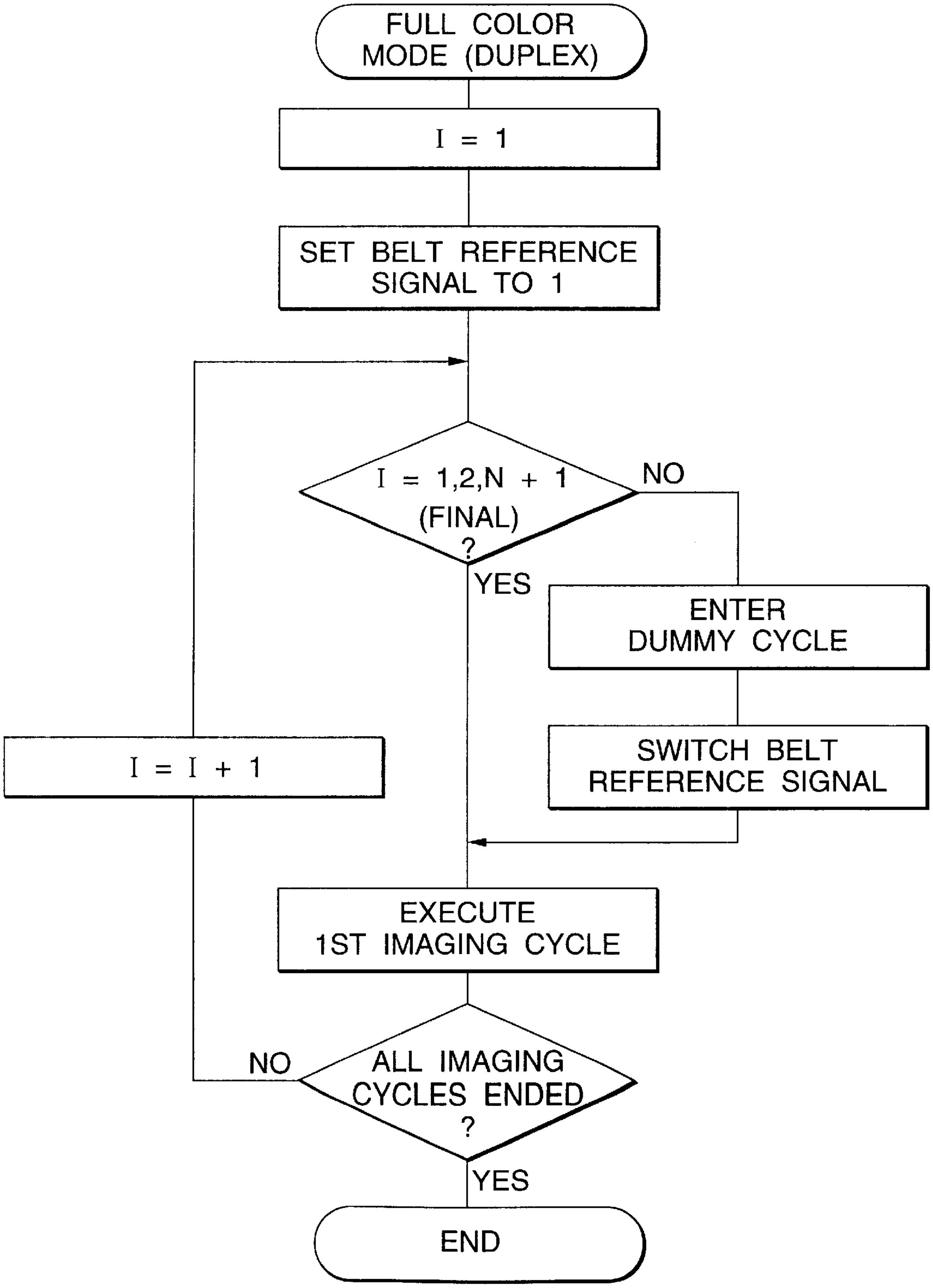
FIG. 23 is a flow chart showing a processing content of a full color (or duplex) mode according to Embodiment 4.
Figure 24:
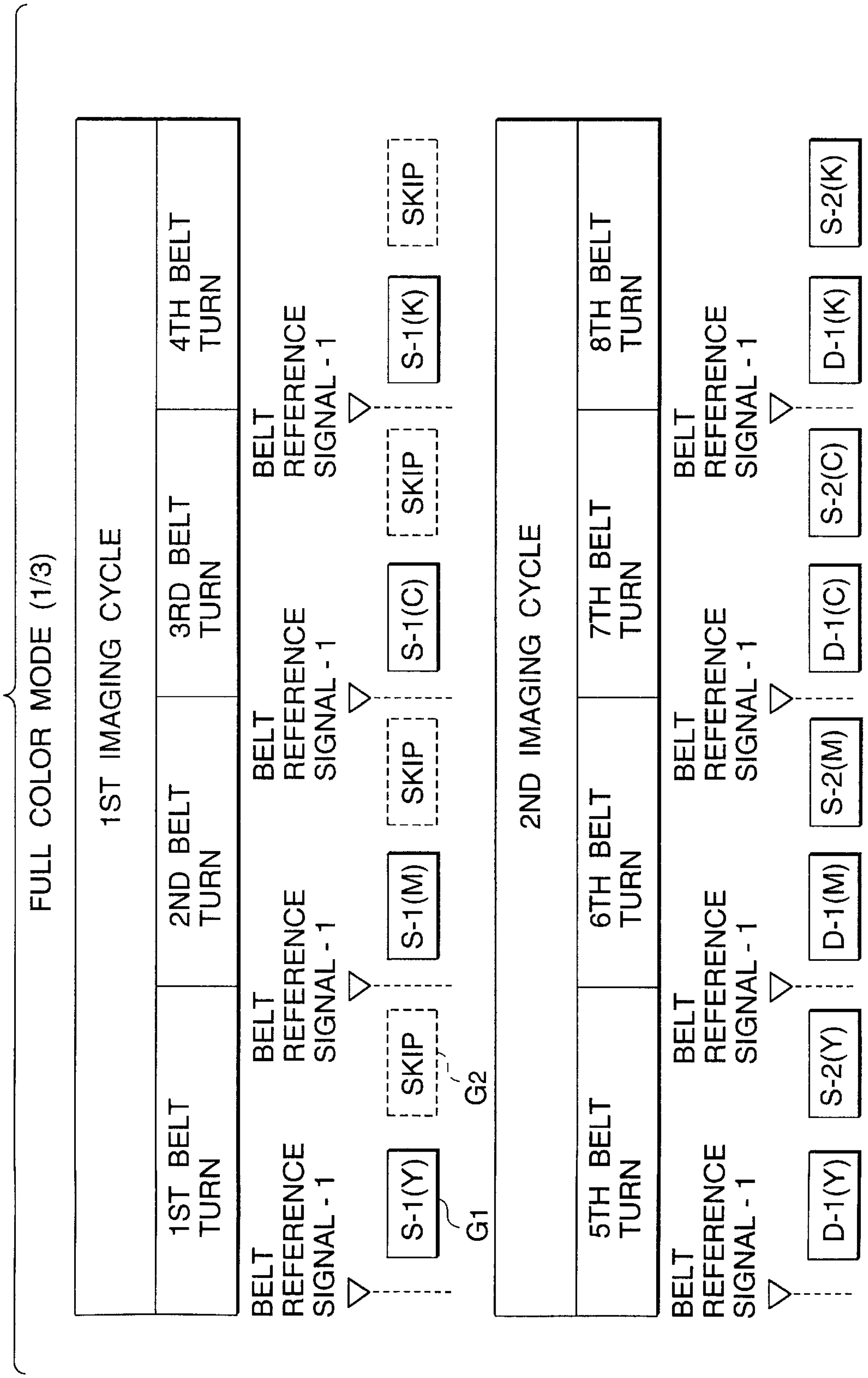
FIG. 24 is an explanatory diagram showing a processing content (1/3) in a full color mode to be used in Embodiment 4.
Figure 25:
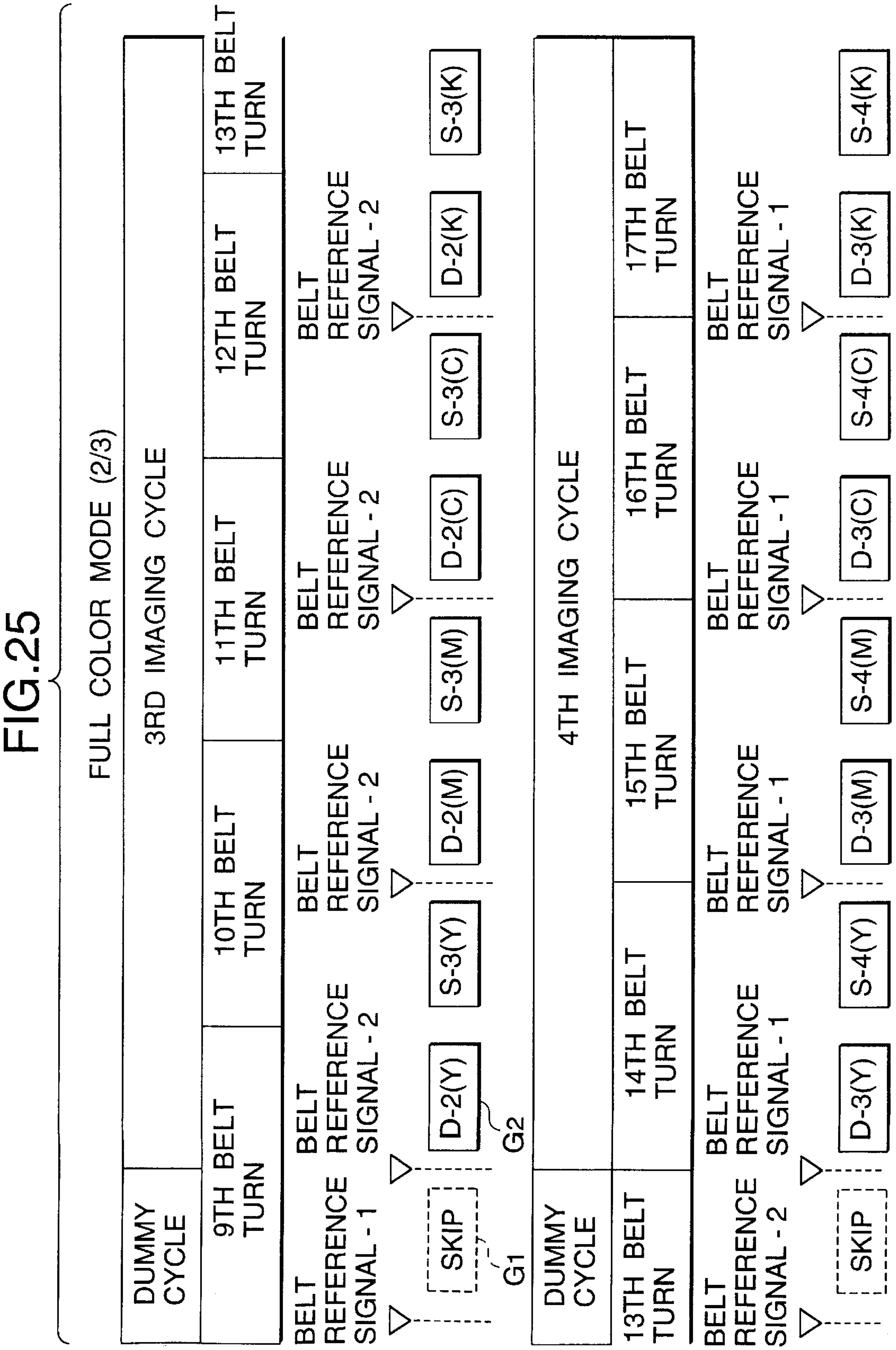
FIG. 25 is an explanatory diagram showing a processing content (2/3) in a full color mode to be used in Embodiment 4.
Figure 26:
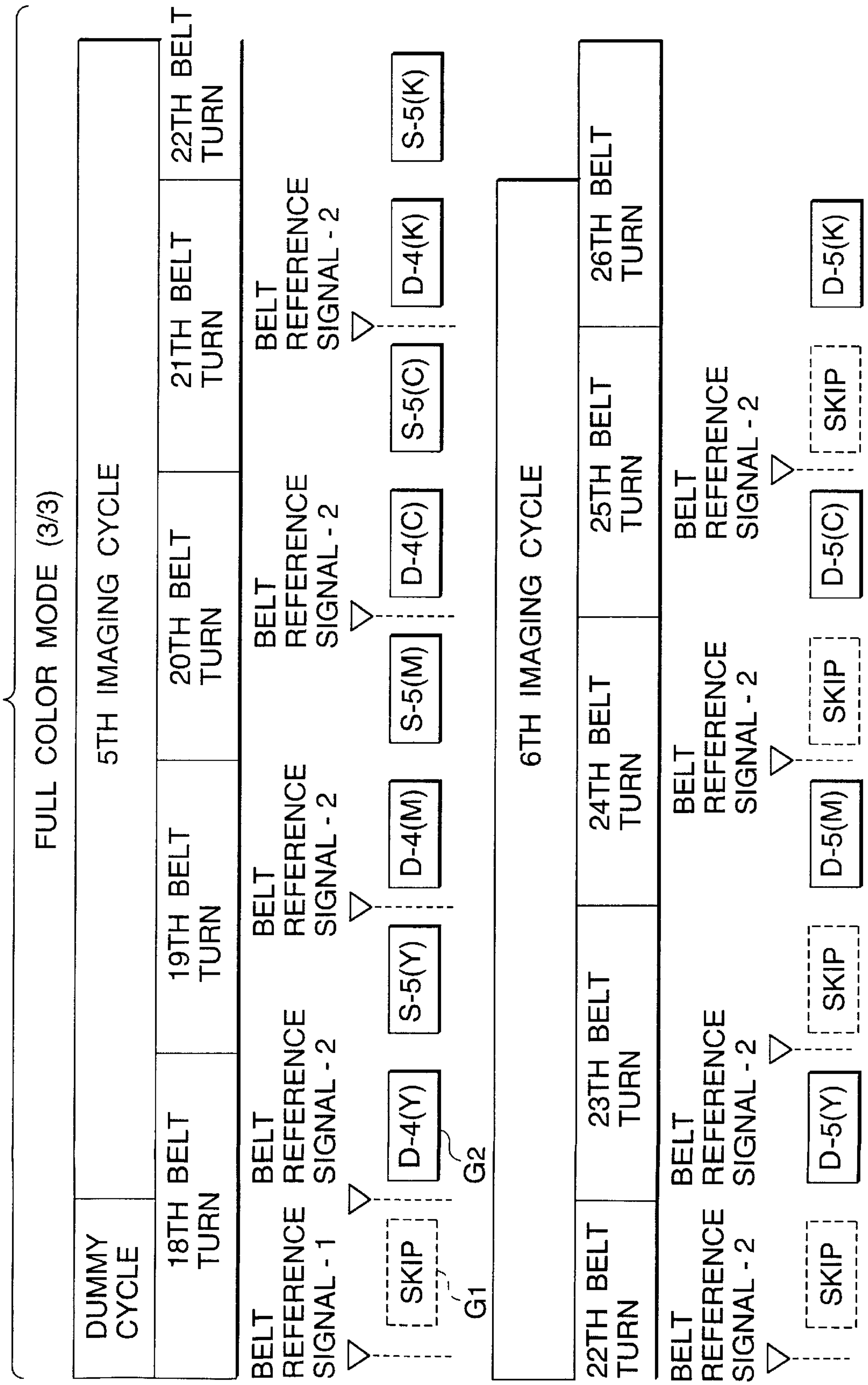
FIG. 26 is an explanatory diagram showing a processing content (3/3) in a full color mode to be used in Embodiment 4.

When the automatic duplex mode and the full color mode are selected, the imaging controller 100 performs the full color mode (duplex) program, as shown in FIG. 23, in the fundamental imaging sequence shown in FIGS. 24 to 26. Here in FIGS. 24 to 26, there are shown the images which are formed at every rotations of the intermediate transfer belt 20 in each imaging cycle, but there are omitted the images which have already been formed in each imaging cycle.

The fundamental imaging sequence shown in FIGS. 24 to 26 is exemplified for a print number n=5.

As shown in FIG. 23, more specifically, the imaging controller 100 sets at first the belt reference signal to 1 (i.e., a belt reference signal −1) on the basis of a detection signal of the first reference mark 911 from the mark sensor 92 and then executes the first imaging cycle (corresponding to the first to fourth turns of the intermediate transfer belt).

In this first imaging cycle, the imaging controller 100 transfers and forms, at each turn of the intermediate transfer belt 20, a first screen image S-1 (including individual yellow, magenta, cyan and black color component images S-1(Y), S-1(M), S-1(C) and S-1(K) ) of the first form on the preceding first image carrier region G1 of the intermediate transfer belt 20 on the basis of the belt reference signal −1, and skips the succeeding second image carrying region G2.

When the intermediate transfer belt 20 makes four turns, moreover, the first screen image S-1 (or the multiplex transfer images of the individual color component images) of the first form is carried on the first image carrying region G1 of the intermediate transfer belt 20 and is transferred to the first face (or surface) of the first form, thus ending the first imaging cycle.

After this, the form having the transferred image is fixed and is then conveyed again to the secondary transfer portion through the form returning conveyor mechanism 60.

Next, the imaging controller 100 executes a second imaging cycle. In the second imaging cycle (at the fifth to eighth turns of the intermediate transfer belt), the imaging controller 100 transfers and forms, at each turn of the intermediate transfer belt 20, a second screen image D-1 (including individual yellow, magenta, cyan and black color component images D-1(Y), D-1(M), D-1(C) and D-1(K)) of the first form on the preceding first image carrying region G1 of the intermediate transfer belt 20 on the basis of the belt reference signal −1, and transfers and forms a first screen image S-2 (including individual yellow, magenta, cyan and black color component images S-2(Y), S-2(M), S-2(C) and S-2 (K)) of the second form on the succeeding second image carrier region G2.

When the intermediate transfer belt 20 makes four turns, moreover, the second screen image D-1 (or the multiplex transfer images of the individual color component images) of the first form is carried on the first image carrying region G1 of the intermediate transfer belt 20 whereas the first screen image S-2 (or the multiplex transfer images of the individual color component images) of the second form is carried on the second image carrying region G2, and the two images on the intermediate transfer belt 20 are individually transferred at the secondary transfer portion to the second face (or the back) of the first form and to the first face (or surface) of the second form, thus ending the second imaging cycle.

After this, the two forms having the consecutively transferred images are individually fixed at the fixing unit 42, and the duplexly fixed forms are discharged as they are through the form discharge passage 61 to the not-shown discharge tray whereas the simplexly fixed form is conveyed again through the form returning conveyor mechanism 60 to the secondary transfer portion.

Next, the imaging controller 100 executes the third imaging cycle, as shown in FIG. 23. Before this, the imaging controller 100 makes a half dummy turn of the intermediate transfer belt 20 to effect the dummy cycle (or a first half of the ninth turn of the intermediate transfer belt) in which the preceding first image carrying region G1 is skipped, and switches the belt reference signal to a belt reference signal −2 (i.e., a reference signal based on a detection signal for the second reference mark 912 from the mark sensor 92).

Here, the dummy cycle is performed to adjust the timing, at which the form having one fixed side is conveyed again to the secondary transfer portion through the form returning conveyor mechanism 60, and the timing at which the back image of the form having the one fixed side is conveyed to the secondary transfer portion, as will be described in the following.

In the third imaging cycle (at the second half of the ninth turn to the first half of the thirteenth turn of the intermediate transfer belt), moreover, the imaging controller 100 transfers and forms, at each turn of the intermediate transfer belt 20, a second screen image D-2 (including individual yellow, magenta, cyan and black color component images D-2(Y), D-2(M), D-2(C) and D-2(K)) of the second form on the preceding second image carrying region G2 of the intermediate transfer belt 20 on the basis of the belt reference signal −2, and transfers and forms a first screen image S-3 (including individual yellow, magenta, cyan and black color component images S-3(Y), S-3(M), S-3(C) and S-3(K)) of the third form on the succeeding first image carrier region G1. After the intermediate transfer belt 20 made four turns, the individual images D-2 and S-3 on the intermediate transfer belt 20 are transferred to the individual corresponding faces of the forms on the basis of the belt reference signal −2, and the transfers and the form conveyances are then performed as in the second imaging cycle.

Next, the imaging controller 100 executes the fourth imaging cycle, as shown in FIG. 23. Before this, the imaging controller 100 makes a half dummy turn of the intermediate transfer belt 20 to effect the dummy cycle (or a second half of the thirteenth turn of the intermediate transfer belt) in which the preceding second image carrying region G2 is skipped, and switches the belt reference signal to the belt reference signal −1.

In the fourth imaging cycle (at the fourteenth to seventeenth turns of the intermediate transfer belt), the imaging controller 100 transfers and forms, at each turn of the intermediate transfer belt 20, a second screen image D-3 (including individual yellow, magenta, cyan and black color component images D-3(Y), D-3(M), D-3(C) andD-3(K)) of the third form on the preceding first image carrying region G1 of the intermediate transfer belt 20 on the basis of the belt reference signal −1, and transfers and forms a first screen image S-4 (including individual yellow, magenta, cyan and black color component images S-4(Y), S-4(M), S-4(C) and S-4(K)) of the fourth form on the succeeding second image carrier region G2. After the intermediate transfer belt 20 made four turns, the individual images D-3 and S-4 on the intermediate transfer belt 20 are transferred to the individual corresponding faces of the forms, and the transfers and the form conveyances are then performed as in the second imaging cycle.

Next, the imaging controller 100 executes the fifth imaging cycle, as shown in FIG. 23. Before this, the imaging controller 100 makes a half dummy turn of the intermediate transfer belt 20 to effect the dummy cycle (or a first half of the eighteenth turn of the intermediate transfer belt) in which the preceding first image carrying region G1 is skipped, and switches the belt reference signal to the belt reference signal −2.

In the fifth imaging cycle (at the second half of the eighteenth turn to the first half of the twenty second turn of the intermediate transfer belt), moreover, the imaging controller 100 transfers and forms, at each turn of the intermediate transfer belt 20, a second screen image D-4 (including individual yellow, magenta, cyan and black color component images D-4(Y), D-4(M), D-4(C) and D-4(K)) of the fourth form on the preceding second image carrying region G2 of the intermediate transfer belt 20 on the basis of the belt reference signal −2, and transfers and forms a first screen image S-5 (including individual yellow, magenta, cyan and black color component images S-5(Y), S-5(M), S-5(C) and S-5(K)) of the last fifth form on the succeeding first image carrier region G1. After the intermediate transfer belt 20 made four turns, the individual images D-4 and S-5 on the intermediate transfer belt 20 are transferred to the individual corresponding faces of the forms on the basis of the belt reference signal −2, and the transfers and the form conveyances are then performed as in the second imaging cycle.

Finally, the imaging controller 100 executes the last imaging cycle, as shown in FIG. 23, with neither the dummy cycle nor the switching the belt reference signal.

In the last imaging cycle (at the second half of the twenty second turn to the first half of the twenty sixth turn of the intermediate transfer belt), moreover, the imaging controller 100 skips the preceding second image carrying region G2 of the intermediate transfer belt 20, at each turn of the intermediate transfer belt 20, on the basis of the belt reference signal −2, and transfers and forms a second screen image D-5 (including individual yellow, magenta, cyan and black color component images D-5(Y), D-5(M), D-5(C) and D-5 (K)) of the fifth form on the preceding first image carrying region G1.

After the intermediate transfer belt 20 made four turns, moreover, the image D-5 on the intermediate transfer belt 20 is transferred to the corresponding face of the last form and is then fixed by the fixing unit until it is discharged to the not-shown discharge tray.

As a result, the series of processes in the full color mode (or automatic duplex mode) are ended to produce the four duplex color prints.

Figure 27:
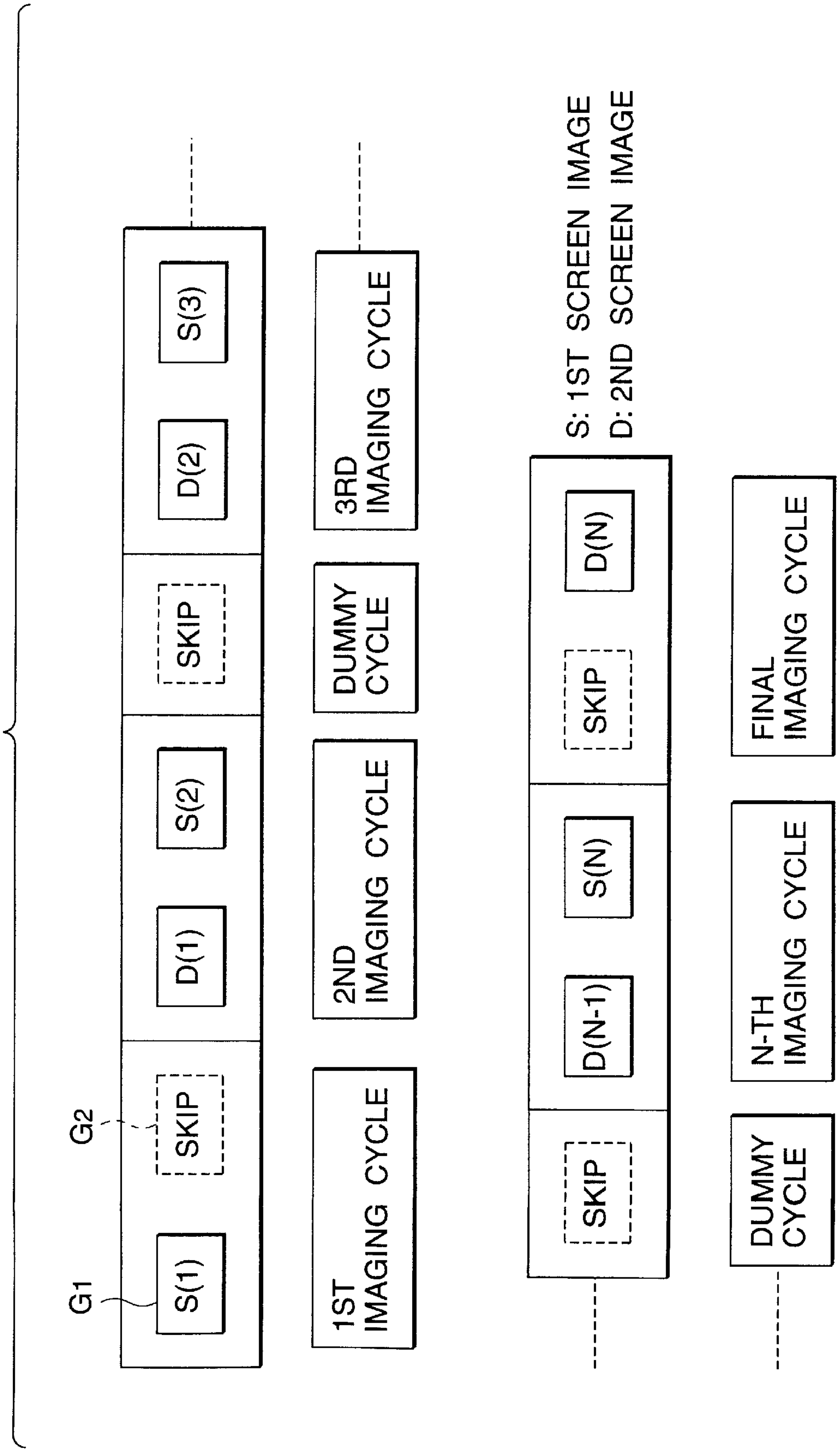
FIG. 27 is an explanatory diagram schematically showing a processing summary of a full color mode to be used in Embodiment 4.

Thus, the imaging process according to this embodiment is illustrated in FIG. 27, if letters S(i) and D(i) designate the first screen image and the second screen image of an i-th form (up to the last form N).

Figure 28:
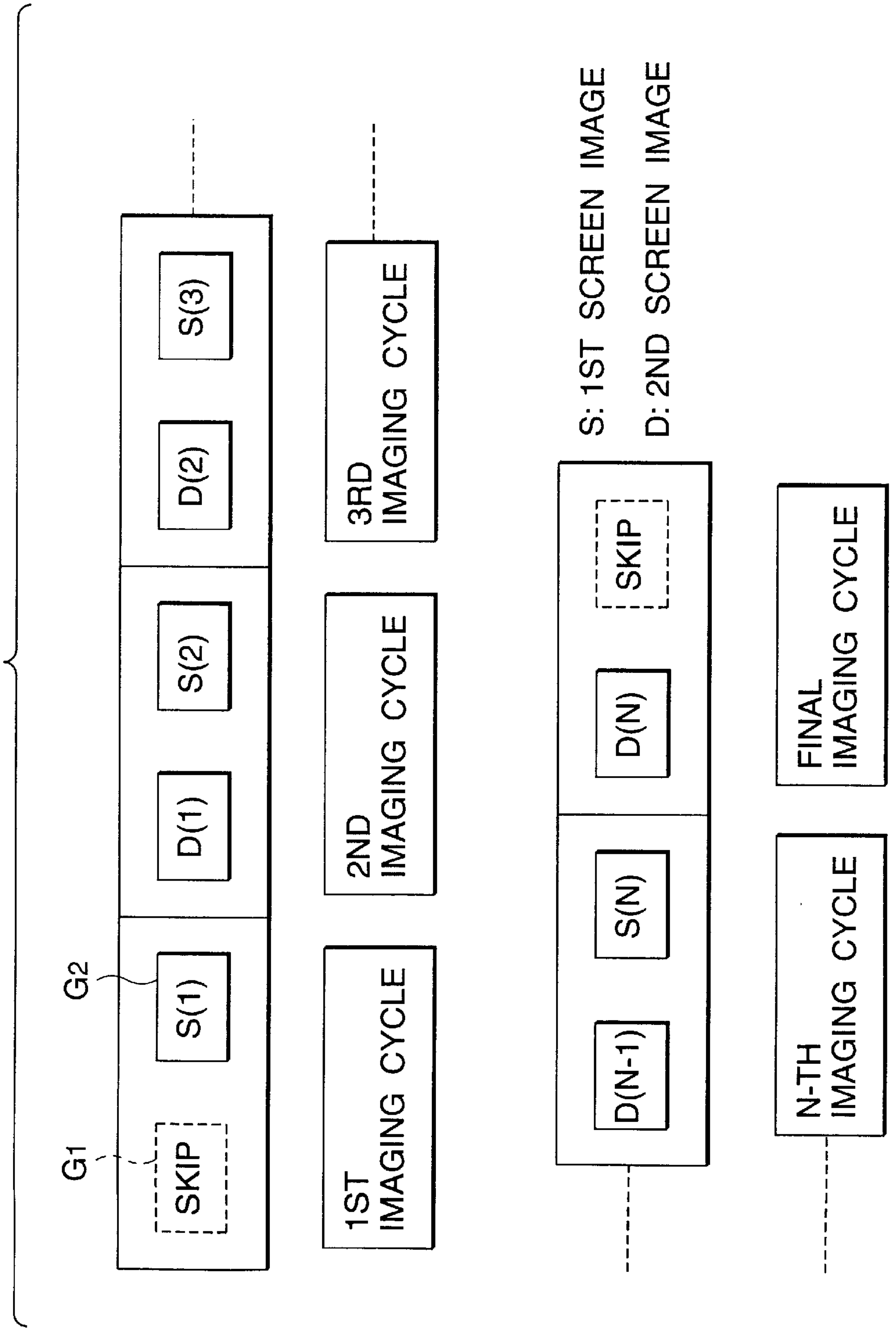
FIG. 28 is an explanatory diagram schematically showing a processing summary of a full color mode to be used in Embodiment 1.

If here are compared the imaging process according to this embodiment and the imaging process (as shown in FIG. 28) according to Embodiment 1. The dummy cycle is provided in this embodiment between the individual imaging cycles from the second imaging cycle to the last but one imaging cycle (i.e., the N-th imaging cycle) but not in Embodiment 1.

It is surely preferable that Embodiment 1 can shorten the processing time period for the imaging process by the absence of the dummy cycle.

It is, however, preferable that this embodiment can easily realize the series of imaging processes by the simple method of inserting the short dummy cycle with the designing restriction that the form returning conveyor passage has to be elongated. It is also preferable for the partial deterioration of the intermediate transfer belt 20 and the ghost that the same image is not always formed on the same face of the intermediate transfer belt 20.

Here are further compared the imaging process according to this embodiment and the imaging process (as shown in FIG. 28) according to Embodiment 1. In this embodiment, unlike Embodiment 1, the skip region is exemplified by the succeeding second image carrying region G2 in the first imaging cycle and by the preceding first image carrying region G1 (or the second image carrying region G2) in the last imaging cycle.

In this embodiment, at this time, the skip regions of the first imaging cycle and the last imaging cycle function substantially as the dummy cycle for the second imaging cycle and the last imaging cycle. This makes it unnecessary to provide an additional dummy cycle between the first imaging cycle and the second imaging cycle and between the last but one imaging cycle and the last imaging cycle.

This embodiment may be modified such that the skip region is exemplified by the preceding first image carrying region G1 in the first imaging cycle and further by the succeeding second image carrying region G2 (or the first image carrying region G1) in the last imaging cycle.

Figure 29:
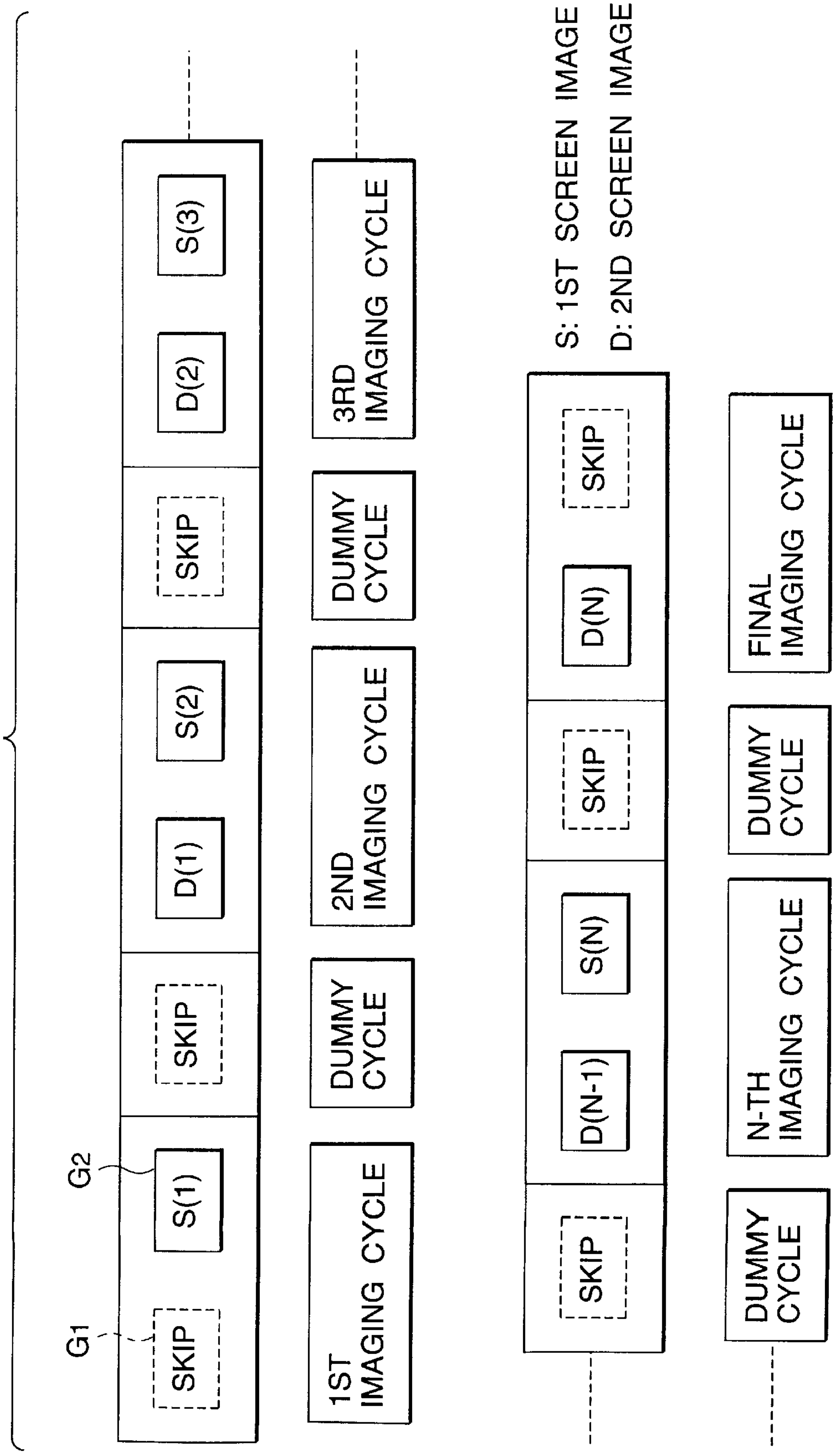
FIG. 29 is an explanatory diagram schematically showing a processing summary of a full color mode to be used in a modification of Embodiment 4.

In this modification, however, the skip regions of the first imaging cycle and the last imaging cycle do not function as the dummy cycles for the second imaging cycle and the last imaging cycle. It is, therefore, necessary to provide an additional dummy cycle between the first imaging cycle and the second imaging cycle and between the last but one imaging cycle and the last imaging cycle, as shown in FIG. 29.

In this embodiment and its modification, on the other hand, the examinations of the oil feed conditions of the fixing unit 42 in the aforementioned imaging process have revealed to provide similar conclusions similar to those of Embodiment 1.

[Embodiment 5]

Figure 30:
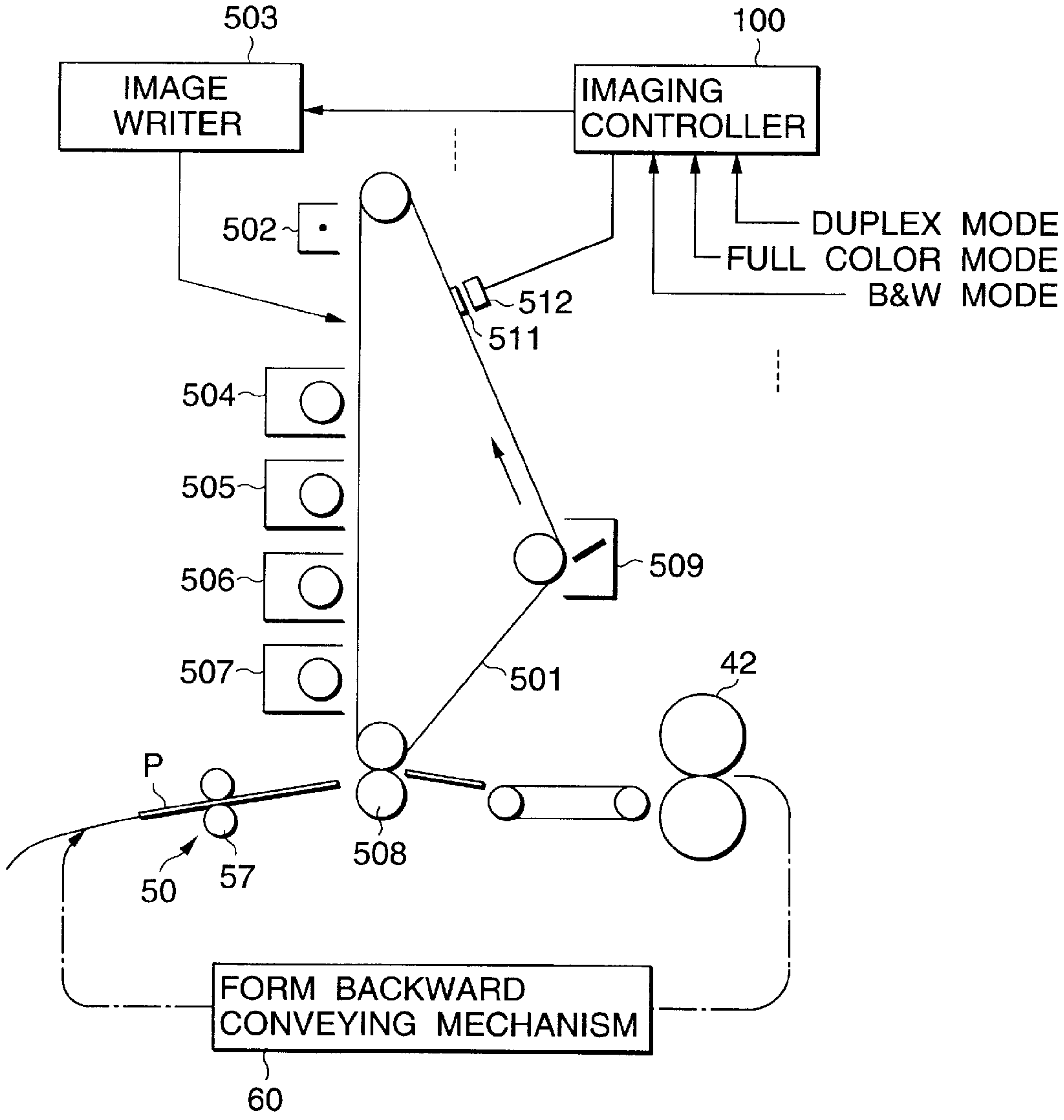
FIG. 30 is an explanatory diagram showing an essential portion of a duplex imaging apparatus according to Embodiment 5.
Figure 31A:
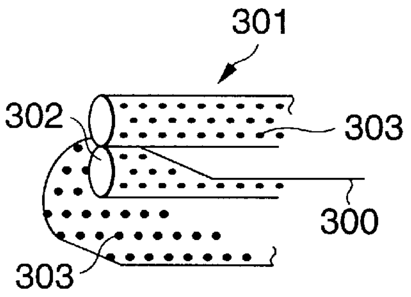
FIGS. 31A to 31C are explanatory diagrams showing a technical problem of an intermediate transfer type duplex imaging apparatus of the prior art.
Figure 31B:
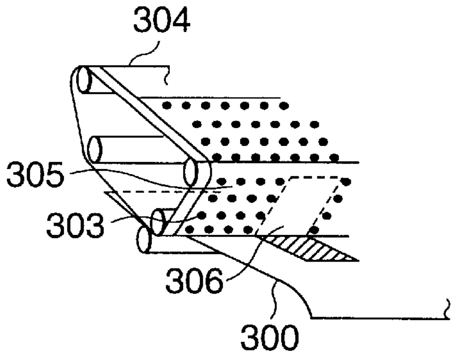
Figure 31C:
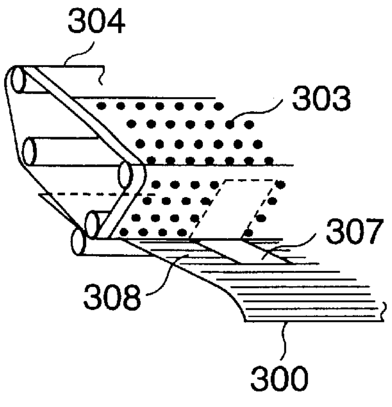

FIG. 30 shows a duplex imaging apparatus according to [Embodiment 5]

In the duplex imaging apparatus according to this embodiment, the invention is applied, unlike the intermediate transfer type of Embodiments 1 to 4, to the type in which a necessary number of color toner images are formed in a laminar state on a photosensitive belt 501 acting as a latent image carrier and transferred as a whole to the form paper P.

In FIG. 30: the reference numeral 501 designates the photosensitive belt of an organic photosensitive material having an insulating surface coating layer; numeral 502 a charger of the Scorotron, for example; numeral 503 an image writer for forming electrostatic latent images of individual color components on the photosensitive belt 501; numerals 504 to 507 developers containing yellow (Y), magenta (M), cyan (C) and black (K) toners, respectively; numeral 508 a transferor for transferring the multiplex toner images, as formed on the photosensitive belt 501, altogether to the form paper P; and numeral 509 a belt cleaner for cleaning the toner left on the photosensitive belt 501 after the transfer step.

Here in FIG. 30: numeral 42 designates the fixing unit; numeral 50 a form conveyor line including the resist roll 57 for delivering the form paper P to the transfer portion at a predetermined timing; and numeral 60 designates the form returning conveyor mechanism.

In this embodiment, the photosensitive belt 501 has a plurality of (not-shown) image carrying regions and further has, in a portion other than its image carrying regions, a reference mark (e.g., an optical reflector or a hole) 511, and a mark sensor 512 is arranged at such a portion apart from the photosensitive belt 501 as to correspond to the moving locus of the reference mark 511.

Moreover, the imaging controller 100 causes the CPU to fetch the signals from the various switches for selecting the various modes such as the duplex mode, the full color mode or the B&W (Black & White) mode and the detection signals from the mark sensor 512 through the I/O port, and executes an imaging program, as prestored in the ROM, to feed predetermined the control signals through the I/O port to the imaging devices including the photosensitive belt 501 and the image writer 503, the fixing unit 42 and the form conveyor line 50, so that it performs the imaging processes corresponding to Embodiments 1 to 4 on the plural image carrying regions of the photosensitive belt 501.

In this embodiment, too, the local transition of the oil of the fixing unit 42 onto the photosensitive belt 501 is suppressed so that neither the heterogeneous solution nor the oil ghost was found in the full color mode (or the automatic duplex mode), as in Embodiments 1 to 4.

According to the invention, as has been described hereinbefore, premising the duplex imaging apparatus in which the image carrier (e.g., the intermediate transferor) is provided with the plural image carrying regions, there is adopted the fundamental imaging sequence in which the images in the number corresponding to the image carriable sheet number are so carried on the image carrier at the dual mode selected time in and after the second imaging cycle, that at least the second screen image is positioned at the front of the first screen image. In and after the second imaging cycle, therefore, at the second screen image fixing time, a large amount of releasing agent is fed to the fixing member located on the side of the first screen image of the sheet, but the amount of releasing agent to the fixing member, as located on the back side of the sheet, can be reduced by the absorption of the releasing agent by the preceding sheet having the fixed second screen image at the time of fixing the first screen image.

As a result, the amount of releasing agent to be transferred to the image carrier can be minimized even if the sheet having the fixed first screen image arrives again at the sheet transfer portion, because the amount of releasing agent to stick to the portion of the sheet facing the image carrier is small.

Even if a half-tone image of wide range is taken in the simplex mode after a plurality of consecutive runs of an identical image in the automatic duplex mode, therefore, the difference in the amounts of releasing agents will not become so large. As a result, the density of the image portion, where the consecutive runs are made in the automatic duplex mode, can become far lower than those of the remaining regions thereby to effectively avoid the so-called "oil ghost phenomenon" having the residual image.

At the duplex (or back) fixing time, on the other hand, the pressurizing and heating processes can be effected by the fixing member, to which much releasing agent has been transferred, thereby to effectively prevent the troubles such as the heterogeneous solution of the first screen image or the offset of the once fixed image.

According to the invention, on the other hand, even if the consecutive executions of the first imaging cycle to the last imaging cycle are made difficult by the designing restriction that the conveyor passage of the sheet returning conveyor means has to be elongated, the imaging process can be smoothly realized by the simple means which is exemplified by inserting a smaller number of dummy cycles than the number of images to be carried by the image carrier into the imaging sequence determining portion.

According to the invention, moreover, if the fundamental imaging sequence is adopted under the condition in which an imaging mode (e.g., the full color mode) having a long conveyor span of the sheet to pass through the fixing unit is selected whereas an imaging sequence different from the fundamental one is adopted under another condition (i.e., a monotone mode such as the Black & White mode) is adopted, it is possible to effectively avoid the image deterioration phenomenon (e.g., the so-called "oil ghost phenomenon") which might otherwise accompany the local transition of the releasing agent from the fixing unit to the image carrier, and to improve the imaging efficiency taking the productivity, for example, as its first priority under the condition in which the oil ghost phenomenon is hard to occur.

What is claimed is:

1. A duplex imaging apparatus comprising: an imaging unit including an image carrier having a number n of image carrying regions for carrying an unfixed image on the image carrying regions of the image carrier in a series of imaging cycles and for transferring the unfixed image to a sheet; a fixing unit for fixing the unfixed image formed on the sheet by the imaging unit; a sheet returning conveyor mechanism for inverting the sheet having one fixed side having passed through the fixing unit and for returning the sheet again to the sheet transfer portion of the imaging unit; and duplex mode control means for controlling the image unit, the fixing unit and the sheet returning conveyor mechanism individually at a duplex mode selected time to fix the unfixed images, the unfixed images being formed consecutively on each face of the sheet, each unfixed image being formed individually by the fixing unit, wherein the fixing unit includes a pair of fixing members for nipping and conveying the sheet such that only one fixing member, as positioned on the side of the unfixed image holding face of the sheet, is provided with releasing agent feed means whereas the other fixing member to be used feeds a predetermined amount of releasing agent indirectly, and wherein the duplex mode control means includes an imaging sequence determining portion for determining such a fundamental imaging sequence that when duplex images more than the number n are to be formed on the sheet, the fundamental imaging sequence determining portion causes the image carrier:

a) to carry first screen images less than the image carriable number in a first imaging cycle of the imaging unit;

b) to carry images corresponding to the image carriable number in and after a second imaging cycle so that at least second screen images may be positioned at the front of the first screen images; and c) to carry the second screen images less than the image carriable number in a last imaging cycle.

2. A duplex imaging apparatus according to claim 1, wherein the imaging sequence determining portion inserts inserting dummy cycles less than the image carriable number between the individual imaging cycles from the second imaging cycle to the last imaging cycle.

3. A duplex imaging apparatus according to claim 2, wherein the imaging sequence determining portion makes:

a) one or more image carrying regions, as positioned on the back side in the advancing direction of the image carrier, into skip regions in which no first screen image is carried, in the first imaging cycle and b) one or more image carrying regions, as positioned on the front side in the advancing direction of the image carrier, into skip regions in which no second screen image is carried, in the last imaging cycle.

4. A duplex imaging apparatus according to claim 1, wherein the fixing unit sets the amount of releasing agent on the side of the fixing member facing the unfixed face of the sheet when the second screen image is to be fixed, to 0.5 microliter per 623.7 sq. cm or more.

5. A duplex imaging apparatus according to claim 1, wherein the fixing unit sets the amount of releasing agent on the side of the fixing member facing the unfixed face of the sheet when the first screen image is to be fixed, to 3 microliter per 623.7 sq. cm or less.

6. A duplex imaging apparatus according to claim 1, wherein the imaging sequence determining portion determines the fundamental imaging sequence such that when the duplex images more than the number n are formed on the sheets under the condition in which an imaging mode for a long conveyance span of the sheets is selected, the imaging sequence determining portion causes the image carrier:

a) to carry the first screen images less than the image carriable number in the first imaging cycle of the imaging unit;

b) to carry the images corresponding to the image carriable number in and after the second imaging cycle so that at least the second screen images may be positioned at the front of the first screen images; and c) to carry the second screen images less than the image carriable number in the last imaging cycle, and wherein the imaging sequence determining portion determines an imaging sequence other than the fundamental imaging sequence under other conditions.

7. A duplex imaging apparatus according to claim 1, wherein said image carrier includes: an image forming carrier for forming and carrying the unfixed image; and an intermediate transferor arranged to face the image forming carrier, and wherein said intermediate transferor has a plurality of image carrying regions.

* * * * *